US009230360B2

(12) United States Patent
Jakobsen et al.

(10) Patent No.: US 9,230,360 B2
(45) Date of Patent: Jan. 5, 2016

(54) CONNECTIVITY DEPENDED GEOMETRY OPTIMIZATION FOR REAL-TIME RENDERING

(75) Inventors: Jakob Sprogøe Jakobsen, Billund (DK); Tue Jakobsen, Vandel (DK); Jesper Martin Erstvang, Vandel (DK)

(73) Assignee: LEGO A/S, Billund (DK)

( * ) Notice: Subject to any disclaimer, the term of this patent is extended or adjusted under 35 U.S.C. 154(b) by 379 days.

(21) Appl. No.: 13/499,797

(22) PCT Filed: Sep. 10, 2010

(86) PCT No.: PCT/EP2010/063296
§ 371 (c)(1),
(2), (4) Date: Jul. 25, 2012

(87) PCT Pub. No.: WO2011/039041
PCT Pub. Date: Apr. 7, 2011

(65) Prior Publication Data
US 2012/0280993 A1    Nov. 8, 2012

(30) Foreign Application Priority Data
Oct. 2, 2009 (DK) .................................. 2009 70141

(51) Int. Cl.
*G06T 17/00* (2006.01)
*G06T 17/30* (2006.01)
(Continued)

(52) U.S. Cl.
CPC ................. *G06T 15/40* (2013.01); *G06T 17/10* (2013.01); *G06T 19/00* (2013.01)

(58) Field of Classification Search
CPC ..... G06F 17/50; G06F 17/5004; G06T 17/00; G06T 17/05; G06T 17/10; G06T 15/08; G06T 19/00
See application file for complete search history.

(56) References Cited

U.S. PATENT DOCUMENTS 6,335,732 B1 * 1/2002 Shaikh .......................... 345/421
6,629,065 B1   9/2003 Gadh et al.
(Continued)

FOREIGN PATENT DOCUMENTS

EP    1 550 085 B1   12/2006
WO   2004/034333 A1   4/2004

OTHER PUBLICATIONS

International Search Report for related international application PCT/EP2010/063296, mailed on Nov. 15, 2011.
(Continued)

*Primary Examiner* — Tize Ma
(74) *Attorney, Agent, or Firm* — Day Pitney LLP

(57) ABSTRACT

Disclosed is a computer-implemented method for visualizing/rendering a computer model, the computer model comprising a plurality of components wherein the method comprises: storing a plurality of parts of at least one of the plurality of components, each part including geometry information for visualizing/rendering the part, storing information indicative of the position and orientation of a plurality of components in a coordinate system, determining a spatial relationship between individual components, determining for the at least one component a number of stored parts to use for visualizing/rendering the component, based on the determined spatial relationship between the individual components. By using the spatial relationship between the components to determine the number of parts to use for visualizing/rendering a component, knowledge about the geometry of individual components and the connections of the components with other components can be used to find hidden parts that can be removed.

16 Claims, 21 Drawing Sheets

(51) Int. Cl.
  *G06T 15/40* (2011.01)
  *G06T 17/10* (2006.01)
  *G06T 19/00* (2011.01)

(56) References Cited

U.S. PATENT DOCUMENTS 7,439,972 B2 * 10/2008 Timcenko .................. 345/420
7,755,620 B2 * 7/2010 Scherer et al. ............. 345/420
2002/0196250 A1 12/2002 Anderson et al.
2003/0103048 A1 6/2003 Kindratenko et al.
2007/0063997 A1 * 3/2007 Scherer et al. ............. 345/419
2009/0187385 A1 7/2009 Zegdoun et al.

OTHER PUBLICATIONS

International Preliminary Examination Report and Written Opinion for related international application PCT/EP2010/063296, mailed on Apr. 12, 2012.

* cited by examiner

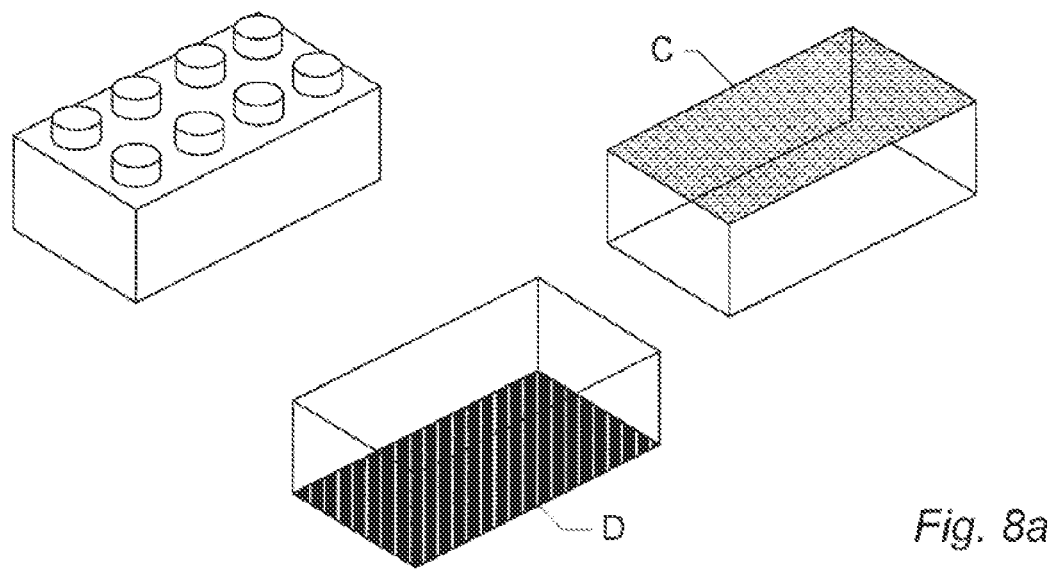
*Fig. 8a*
| CON Z | C | D |
|---|---|---|
| C | UC | C |
| D | C | C |
*Fig. 8b*
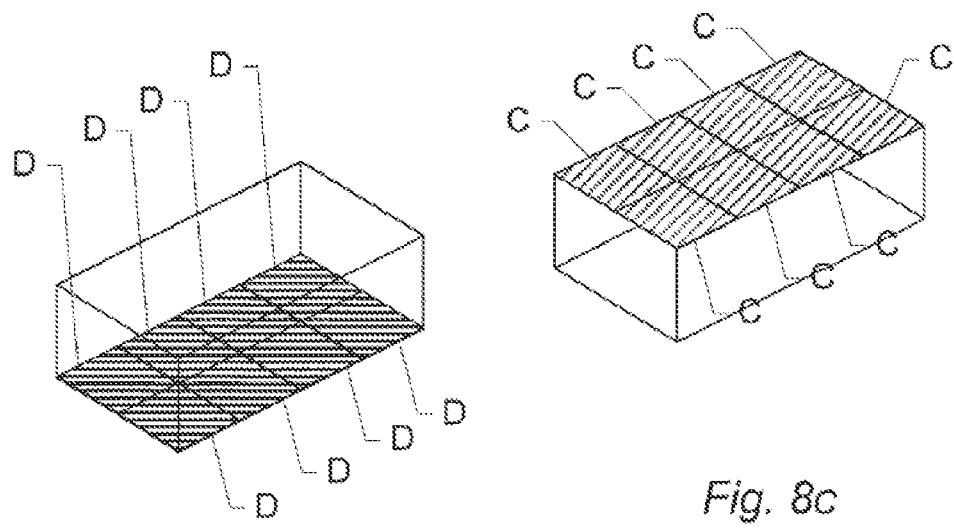
*Fig. 8c*

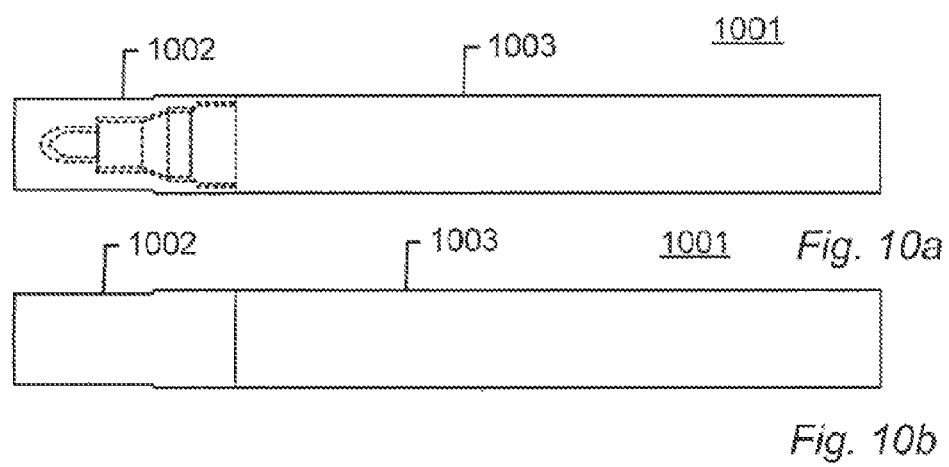
Fig. 10a
Fig. 10b
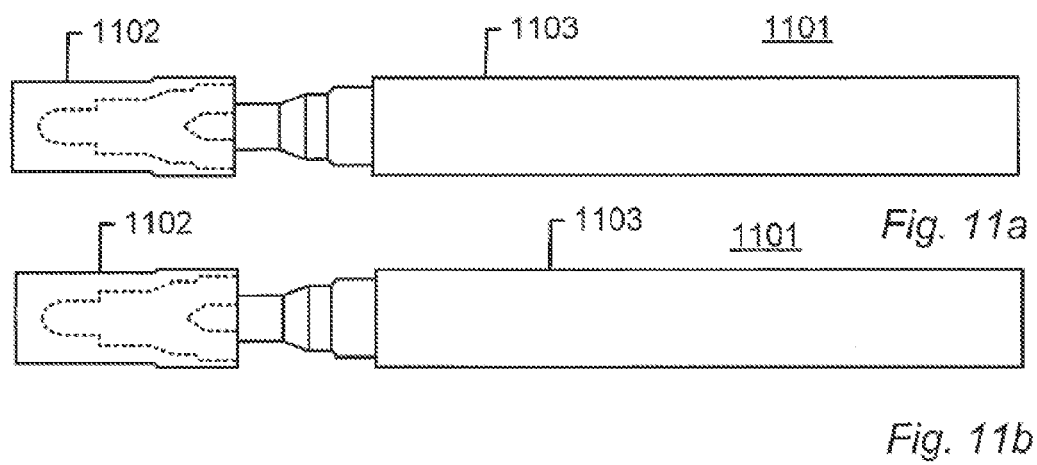
Fig. 11a
Fig. 11b

CONNECTIVITY DEPENDED GEOMETRY OPTIMIZATION FOR REAL-TIME RENDERING

CROSS-REFERENCE TO RELATED APPLICATIONS

This application is a U.S. National Stage of International Application No. PCT/EP2010/063296, filed Sep. 10, 2010, which includes a claim for priority based on Danish Patent Application No. PA200970141, filed Oct. 2, 2009, the contents of which are incorporated herein by reference.

FIELD OF THE INVENTION

The invention relates to a method for visualising/rendering a computer model. Specifically the invention relates to a computational efficient method for visualising/rendering a computer model.

BACKGROUND OF THE INVENTION 3D computer graphics is used in a wide range of fields such as computer aided design (CAD) and computer games. 3D computer graphics may be used to generate perspective views of 3D models. This may be used in a design process as is the case with CAD or for the purpose of entertainment as is the case with computer games. A common problem facing 3D compute graphics is the large computational resources needed. This is especially a problem for real time 3D computer graphics as the lack of computational resources will result in a decreased frame rate with a corresponding decreased user experience.

The intensive research in computing has been matched by an analogous increase in complexity of the computer models. This is both the case for CAD where larger structures are design as well as computer games where an increased detail level results in more complex models. A common group of objects to represent with 3D computer graphics are composite products. Composite products are products comprised of a number of smaller physical components.

Examples of composite products comprising a large number of components include large machines, cars, airplanes and other vehicles, buildings, as well as products that are sold and shipped unassembled, such as furniture, toy models, etc. A particular example of products that are composed of a large number of smaller components, include toy construction sets including a plurality of interconnectable toy construction elements.

There are various known types of modelling concepts of such toy construction sets. Especially modular or semi-modular concepts are very popular as they provide an interesting and challenging play experience. Typically, these concepts provide a set of pre-manufactured building elements that can be interconnected with each other in some predetermined way by means of connection elements or other coupling means of the pre-manufactured elements. The pre-manufactured building elements may resemble well-known objects adapted to a specific modelling task. Thus in e.g. building a model of a house the building elements may resemble wall bricks, roof tiles, doors, and windows. An advantage of selecting the building elements in this way is that the play is put into system and the work involved with the building of a model of a house is reduced significantly compared to a situation where all details of the house are to be defined each time a new model should be made. However, the complete freedom in building a house or another object is traded off for the simplicity of building the model.

For example, the toy construction sets available under the name LEGO comprise a plurality of different types of interconnectable building elements having protrusions and corresponding cavities as connecting elements. The connecting elements are arranged according to regular grid patterns, thereby allowing a wide variety of interconnections between building elements.

A known way of reducing the computational load needed for visualising/rendering a computer model is occlusion culling. Occlusion culling works by finding faces hidden from a given viewing perspective. Known occlusion culling algorithms are however slow and need to be run every time the view changes. This is especially a problem for computer aided design and computer games as the view in these application typically changes often resulting in an a large computational load caused by the occlusion culling algorithm.

It remains thus a problem to visualise/render composite products, in a computationally efficient way.

SUMMARY

A first aspect of the invention relates to a computer-implemented method for visualising/rendering a computer model, the computer model comprising a plurality of components wherein the method comprises:

storing a plurality of parts of at least one of the plurality of components, each part including geometry information for visualising/rendering the part, storing information indicative of respective positions and orientations of a plurality of components in a coordinate system determining a spatial relationship between individual ones of the components based on the stored information indicative of the respective positions and orientations of the plurality of components determining, for the at least one component and based on the determined spatial relationship between the individual components, a number of stored parts to be used for visualising/rendering said component.

The computer model may represent any object such as a composite product e.g. a toy model or alternatively a non-composite product e.g. a digital character. The computer model may have any dimensions such as two dimensions or three dimensions. The computer model may further be animated over time. The animation of the computer model may involve the entire model or selected components of the model. A component may be any subgroup of the model such as a toy construction element when the computer model represents a toy model built of toy construction elements or alternatively a group of faces of a toy construction element. A part may be any subgroup of a component such as a protruding cylinder on a toy construction element or alternatively a group of faces of a protruding cylinder.

In one embodiment subgroups are proper subgroups meaning that a component can not be the entire model, and a part can not be the entire component.

In one embodiment subgroups are not restricted to be proper subgroups meaning that a component can be the entire model, and a part can be the entire component.

A part may comprise geometry information, defining the geometry of the part. The geometry information may be stored in any format such as a polygonal mesh, NURBS surfaces or Patch surfaces. The part may further comprise material properties of the part such as texture properties, reflection properties, refraction properties, transparency settings and shading properties.

The information indicative of the position and orientation of a component may be the position and orientation of the component in any coordinate system local or global or information describing their position in a relation to another model, component, part or the like e.g. as disclosed in WO04034333.

The number of parts to use for visualising/rendering a component may be any number including the special cases when all parts of the component are used and when no parts are used.

The result of visualising/rendering a computer model may be the creation of an image or a series of images. The image/s may be 2 dimensional. The image/s may be directly shown on a screen and/or saved in a digital file.

By sub-dividing the components into a plurality of parts and using the spatial relationship between the components to determine the number of parts to use for visualising/rendering a component, knowledge about the geometry of individual components and the connections of the components with other components can be used to find hidden parts that can be removed without having visual impact on the model.

This makes it possible to find hidden parts without using computationally complex ray tracing algorithms, thereby making the method suitable for real time use. By using the spatial relationship between the individual components and not the spatial relationship between the virtual camera and the components, as is the case in standard occlusion culling algorithms, a view-independent optimization is achieved. This saves computational resources as the method only needs to be rerun when structural changes occur to the composite model, e.g. a new component is added or an existing component is removed. Even when a structural change does occur, the method only needs to be rerun on the components that are in proximity of the change. This saves computational resources for subsequent optimization.

By dividing the components into parts and storing the parts before performing the optimisation any computational resources needed for dividing the components in the optimization step is saved. The subdivision of the components may be performed using an automatic procedure or alternatively manually. When the subdivision is performed manually human skill may be used to make the subdivision using knowledge about the geometry and/or connections of the components, thereby enabling an effective optimization.

A second aspect of the invention relates to a computer program, wherein the computer program comprises executable computer-program code adapted to cause a data processing system to perform:

at least a design step comprising
   providing a computer-implemented construction tool for allowing a user to select a respective digital representation of a plurality' of components from a repository of components, where each component is comprised of a plurality of parts, and to arrange the selected components in a spatial relationship to each other so as to generate a digital representation of a composite product;

and a further processing step comprising
   generating a visualising/rendering at least a portion of the composite product wherein generating comprises:
   storing a plurality of parts of at least one of the plurality of components, each part including geometry information for visualising/rendering the part,
   storing information indicative of the position and orientation of a plurality of components in a coordinate system
   determining a spatial relationship between individual ones of the components based on the stored information indicative of the position and orientation of the plurality of components
   determining for the at least one component a number of stored parts to use for visualising/rendering said component, based on the determined spatial relationship between the individual components.

In one embodiment the computer program is a toy computer program for children.

The computer-implemented construction tool may be a graphical user interface.

The task of creating digital models can be very challenging. The normal physical limits that exist in the real world are a priori not present in a digital environment. The endless possibilities make it possible to create any model, however it also makes the design step very challenging. A key skill for any digital modeller is to use the right amount of detail at the right points in the model. This means that besides having to focus on the shape of the digital model a digital designer also needs to be focused on the underlying structure of the model e.g. the amount of vertexes used at various places. This is important because the modelling task is an interactive process typically involving continuous real-time visualising/rendering of the model, allowing the digital designer to visually inspect the model while it is being designed. If the model becomes unnecessarily complex the frame rate of the real-time rendering of the model will decrease making the further design process problematic.

When the user of such a system is a child it becomes important to simplify the design process as much as possible. By supplying the child with a digital construction tool comprising a repository of components and further automatically simplifying the constructed model using the spatial relationship between the components, the complexity of the design process is greatly reduced. This will allow the child to exclusively focus on the modelling task without having to worry about applying the right amount of complexity to the right spots of the model. This will allow children to create larger more interesting models, increasing the play value of the toy computer program, as well as allowing younger children to use the toy program.

In one embodiment, at least one component has associated with it at least one predetermined connection zone, wherein said connection zone is indicative of a portion of the component that can be connected to connection zones on similar components.

The connection zone may be any predefined zone in a proximity of the component. In one embodiment the connection zone is positioned on the surface of the component. The connection zone may correspond to or be defined by one or more parts of the component e.g. a portion of the surface. The connection zone may have any shape such as a plane or a section of a plane or round or a curved surface. The position of the connection zone may be defined in a global coordinate system or in relation to the component. A component may comprise any number of connection zones. Multiple types of connection zones may exist. A connection zone may be compatible with a predefined number of types of connection zones, e.g. a connection zone of a component representing a toy construction element, linked to the top of the component, may only be compatible with connection zones linked to bottoms of components representing similar toy construction elements. In some embodiments, information indicative of the compatibility of respective types of connection zones may be stored in a suitable data structure, e.g. a table, i.e. information indicative of whether respective types of connection zones are connectable with each other. For example, the information may be indicative, for each given type of connection zone, which types of connection zones are connectable with said given type of connection zone. In one embodiment, the data structure may indicate for each pair of types of connection zones whether the pair of types of connection zones if compatible, incompatible, or indifferent. When a pair of connection zones is compatible, they can provide a connection between two components. When a pair of connection zones is incompatible, they prevent positioning of two components next to each other. When a pair of connection zones is indifferent, they allow positioning of two components next to each other, without actually providing a connection between the components.

By providing the components with predefined connection zones the job of creating models from the components is simplified. This lowers the production cost of developing models whether the models are used for CAD, computer games or other applications.

In one embodiment of the invention the step of determining a spatial relationship between individual components comprises the step of determining the spatial relationship of connection zones of the individual components.

In one embodiment of the invention the step of determining the spatial relationship between individual connection zones comprises the step of determining a distance between two connection zones.

The distance may be any norm distance such as a 2 norm Euclidian distance. The distance may be a distance between two points of the connection zones or a plurality of points on the connection zones. In one embodiment the distance is defined as the closest distance between two connection zones. In one embodiment the process determines two connection zones as being connected when their distance is within a predefined range.

Determining the spatial relationship between two connection zones by examining their distance is an effective and computational simple method. This will lower the computational resources need by the method thereby lowering the overall number of computations necessary to render/visualise a model.

In one embodiment, each connection zone has an orientation associated with it, and the step of determining the spatial relationship between individual connection zones comprises the step of determining the orientation of one connection zone relative to another.

In one embodiment, the process determines two connection zones as being connected when they have a predetermined orientation relative to each other, e.g. when the connection zones are parallel or in proximity of being parallel to each other. The spatial relationship between connection zones may be determined by a combination of a distance between the connection zones and their relative orientation.

Two connection zones may be positioned close to each other without being aligned however, by additionally using the relative orientation between connection zones to determine their spatial relationship a more precise determination can be achieved.

In some embodiments, the process determines two connection zones as being connected when they are positioned in a predetermined proximity to each other, and when their respective orientation and types are compatible with each other.

In some embodiments the process determines a first part as not to be used for visualising/rendering a component only if the component has one or more connection zones associated with said first part, which connection zone(s) is/are connected to another connection zone of another component.

By only optimizing components that are actually connected, re-optimization can be avoided when un-connected components are moved relative to each other during animation. This will lower the need for re-optimization, thus resulting in a corresponding lowering of the computational resources needed for the optimization, as the event that connected toy construction elements are moved relative to each other is much less likely than for un-connected toy construction elements.

In alternative embodiments, the process also determines a first part as not to be used for visualising/rendering a component when a connection zone associated with the first part is in a predetermined proximity and/or orientation relative to a connection zone of another component, without the connections actually providing a connection between the components, e.g. because the types of the two connection zones are indifferent with respect to each other.

By also optimizing components that are not connected, more parts of the components can be optimized. This will lower the computational resources need for visualise/render the computer model, especially when the components of the model are stationary.

In one embodiment determining the spatial relationship comprises determining whether connection zones of respective components have a compatible type that provide/allow a connection.

In one embodiment the step of determining for the at least one component a number of parts to use for visualising/rendering said component, fewer parts are used when at least one connection zone/s of said component is connected.

In one embodiment the process determines a first part as not to be used for visualising rendering a component when at least a predetermined portion of the surface area of the part is covered by one or more other parts when viewed from any direction outside of the bounding box of said computer model. The predefined percentage may be any percentage. Preferably it is 40%, more preferably it is 70%, even more preferably it is 90%. The bounding box is the smallest box that can comprise the entire model. By not using part/s that are covered with a predefined percentage for visualising/rendering a given component any visual impact on the model of the optimization can be limited. This further provides a flexible system where the trade-off between visual impact and computational complexity can be controlled. In a given application, such as real-time computer graphics, it may be useful to prioritise a low number of computations, resulting in a high frame rate, over visual precision of the model, whereas visual precision in other applications may be more important than the number of computations.

In one embodiment of the invention the step of determining for the at least one component a number of parts to use for visualising/rendering said component further comprises the step of determining material properties of a component, and based on both the determined spatial relationship and the determined material properties, determining a number of parts to use for visualising/rendering said component.

In one embodiment the step of determining material properties comprises the step of determining the transparency settings for a component. The transparency settings may be any settings related to the transparency of the component or a part of the component. The transparency may involve refraction phenomena. Parts of a component of a model that normally would be hidden may be visible if the component or other components connected to the component is transparent.

By using both the determined spatial relationship and the material properties, a more precise determination of hidden parts can be achieved.

In some embodiments the computer model represents a composite product. In some embodiments the computer model represents a toy model built from toy construction elements, where each component of the computer model corresponds to a toy construction element. In some embodiments the toy construction elements have connection means for connecting them with other similar toy construction elements. The connection means may have any shape such as round, or rectangular.

In one embodiment a first component comprises a first occlusion zone of a predetermined type and a second component comprises a second occlusion zone of a predetermined type, wherein the spatial relationship between the first and second occlusion zone is used to determine a portion of the first component occluded by the second component.

The occlusion zones may have a shape similar or even identical to a part of a component. For example, and occlusion zone may be defined as a part of the surface of said part of the component. The occlusion zone may be linked to a specific part or number of parts of the component. Part/s linked to an occlusion zone may be determined as being occluded when the occlusion zone linked to the part is occluded. The spatial relationship between the first and the second occlusion zone may be determined by the spatial relationship between connection zone/s of the first component and connection zone/s of the second component. The type of the occlusion zone may be related to its shape. The occlusion zone may have any shape such as a round or rectangular shape. The type of occlusion zone may further be related to a size of the occlusion zone. The type of occlusion zone may determine how one component occludes another, e.g. a round occlusion zone may occlude another round occlusion zone but not a square occlusion zone, a square occlusion zone may occlude both a round and a square occlusion zone.

Connection zones may determine how a component can be connected to other components whereas occlusion zones may determine how a component occludes another component. Two components may be connected without occluding each other and two components may occlude each other without being connected.

A component and/or one or more parts of a component may have one or more occlusion zones and/or one or more connection zones associated with it. In one embodiment a connection zone may also function as an occlusion zone.

By assigning occlusion zones to the components, the method is able to easily find hidden parts in the computer model. A hidden part may be found by examining the spatial relationship between two connection zones of two components. If two connection zones associated with the respective components are found to be connected, the process may determine one or more occluded parts based on respective occlusion zones associated with the respective parts, e.g. based on logic rules related to the respective types of the associated occlusion zones, e.g. a square zone covers a round zone etc. Hence, each part may have one or more connection zones and one or more occlusion zones associated with it.

In one embodiment a plurality of occlusion zones are linked to a single part.

In one embodiment a part is only occluded if all occlusion zones linked to the part are occluded.

In one embodiment a computer model may be animated independently of other computer models, a component of a computer model may be animated independently of other components of the computer model and a part of a component may not be animated independently of other parts of the component.

In one embodiment a first part and a second part represent a common section of a component, wherein the first part has a higher level of detail than the second part and wherein the step of determining a number of stored parts to use for visualising/rendering said component further comprises selecting at most one of the first and second part to use for visualising/rendering said component.

By having a plurality of parts representing a common portion of a component, parts that in a given situation are only partially hidden can still be optimized. This will result in a more efficient optimization and make the job of dividing components into parts easier.

The different aspects of the present invention can be implemented in different ways including the computer implemented method, a data processing system and toy computer programs described above and in the following and further product means, each yielding one or more of the benefits and advantages described in connection with at least one of the aspects described above, and each having one or more preferred embodiments corresponding to the preferred embodiments described in connection with at least one of the aspects described above and/or disclosed in the dependent claims. Furthermore, it will be appreciated that embodiments described in connection with one of the aspects described herein may equally be applied to the other aspects.

In one embodiment the parts are predefined.

In one embodiment each part comprises a plurality of faces, where a face is defined as a plane given by three vertexes.

In one embodiment occlusion culling is used in combination with the disclosed method.

In one embodiment a component represents a physical component of a composite product, such as a physical component of the composite product that can not non-destructively be further decomposed in smaller components, e.g. a screw in an airplane or a toy construction element in a toy model built from toy construction elements of a toy construction system.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein:

FIG. 8a shows connection zones defined in relation to a component.

FIG. 8b shows the compatibility of connection zones defined in relation to a component.

FIG. 8c shows an example of connection zones associated with a component.

FIG. 10a shows a computer model comprising a number of components prior to optimization.

FIG. 10b shows a computer model comprising a number of components after optimization.

FIG. 11a shows a computer model comprising a number of components prior to optimization.

FIG. 11b shows a computer model comprising a number of components after optimization.

DETAILED DESCRIPTION

In the following description, reference is made to the accompanying figures, which show by way of illustration how the invention may be practiced.

Figure 1A:
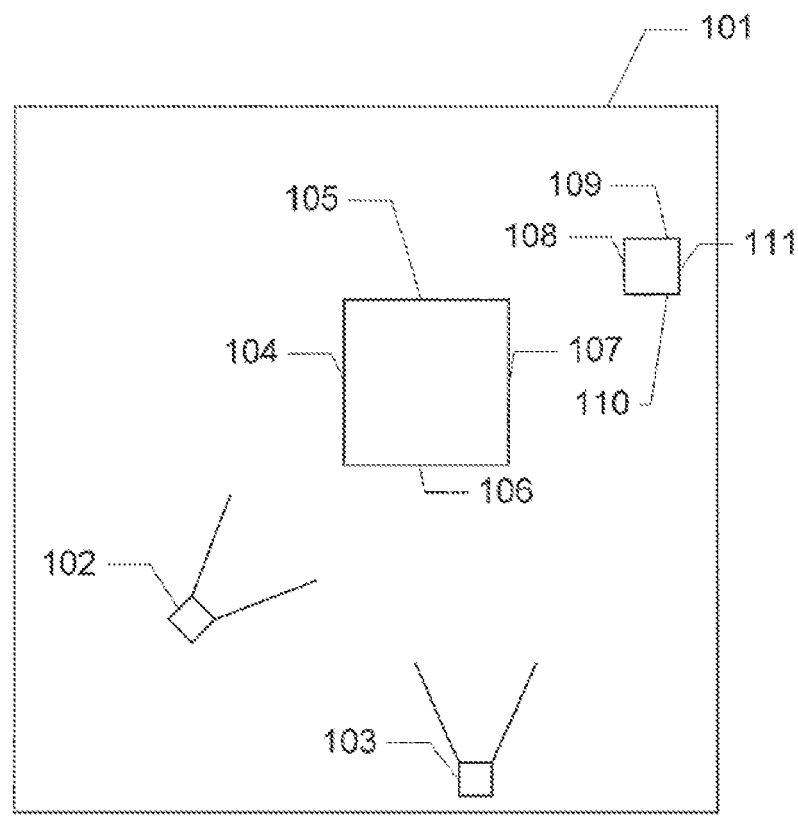
FIG. 1a-c show an example of a form of prior art optimization.
Figure 1B:
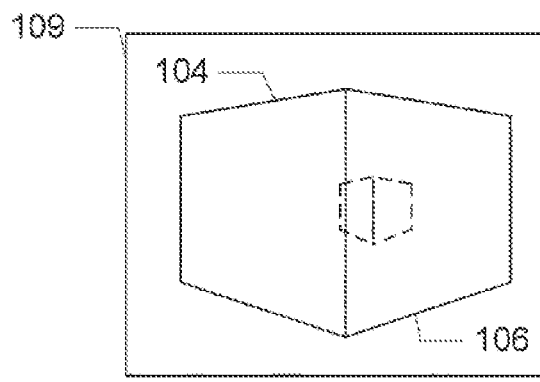
Figure 1C:
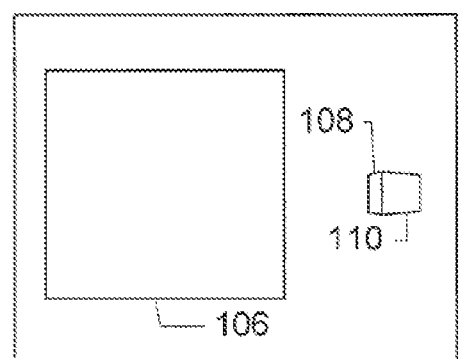

FIGS. 1a-c show an example of the prior art form of optimization, occlusion culling. The basic idea of occlusion culling is to examine the spatial relationship between a camera and a scene to find hidden surfaces that can be left out in the rendering/visualisation process. FIG. 1a shows a top view of a 3D scene comprising two virtual cameras 102, 103, a large box 104, 105, 106, 107 and a small box 108, 109, 110, 111. FIG. 1b shows the image generated by the virtual camera 102. Only two surfaces 104, 106 of the large box can be seen, all the remaining surfaces are hidden. Using rays tracing methods the occlusion culling algorithms can find these hidden faces and remove them. This is however a computationally highly demanding process. FIG. 1c shows the image generated from the camera 103. Due to the change in perspective, the small box previously shadowed by the large box can now be seen. This illustrates a limitation of occlusion culling methods. They are highly view depended. This makes occlusion culling less useable for applications where the viewing perspective often changes.

Figure 2A:
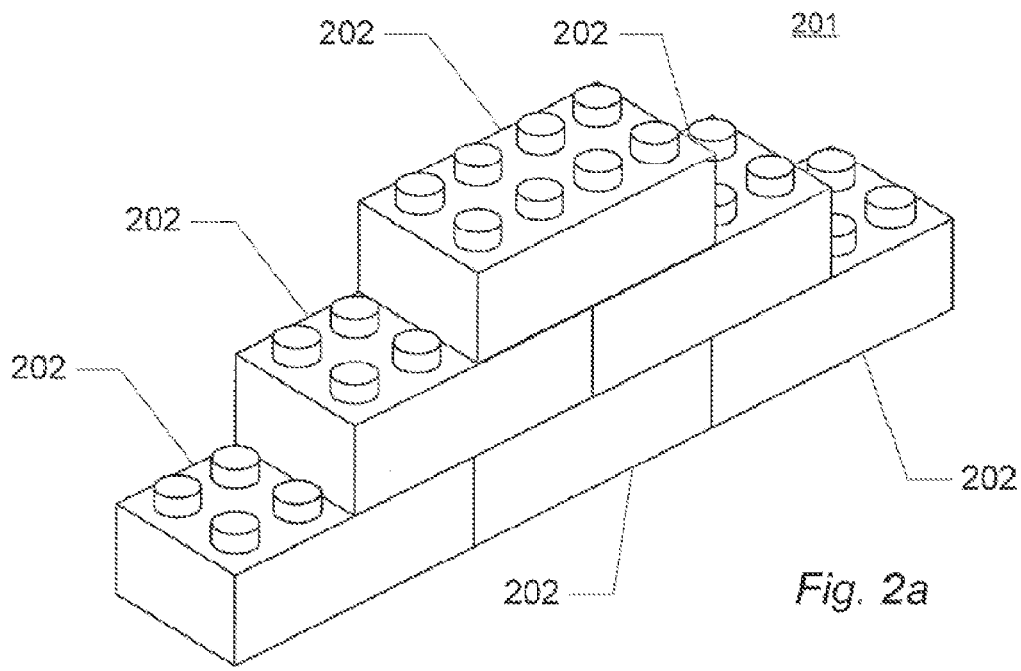
FIG. 2a shows an example of a computer model comprising a number of components.
Figure 2B:
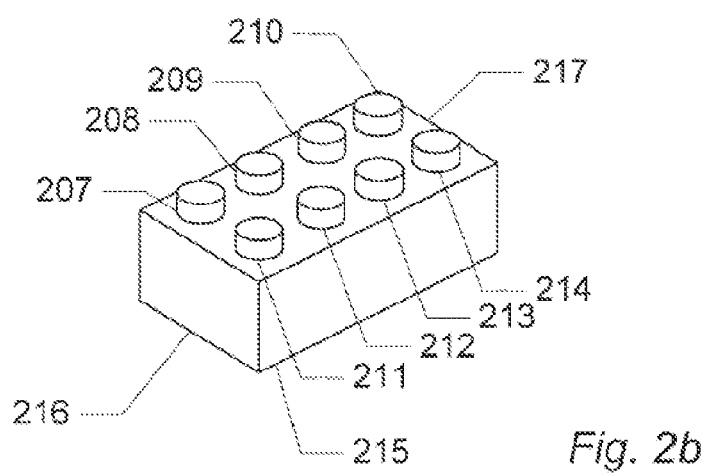
FIG. 2b shows an example of a component of a computer model comprising a number of parts.
Figure 2C:
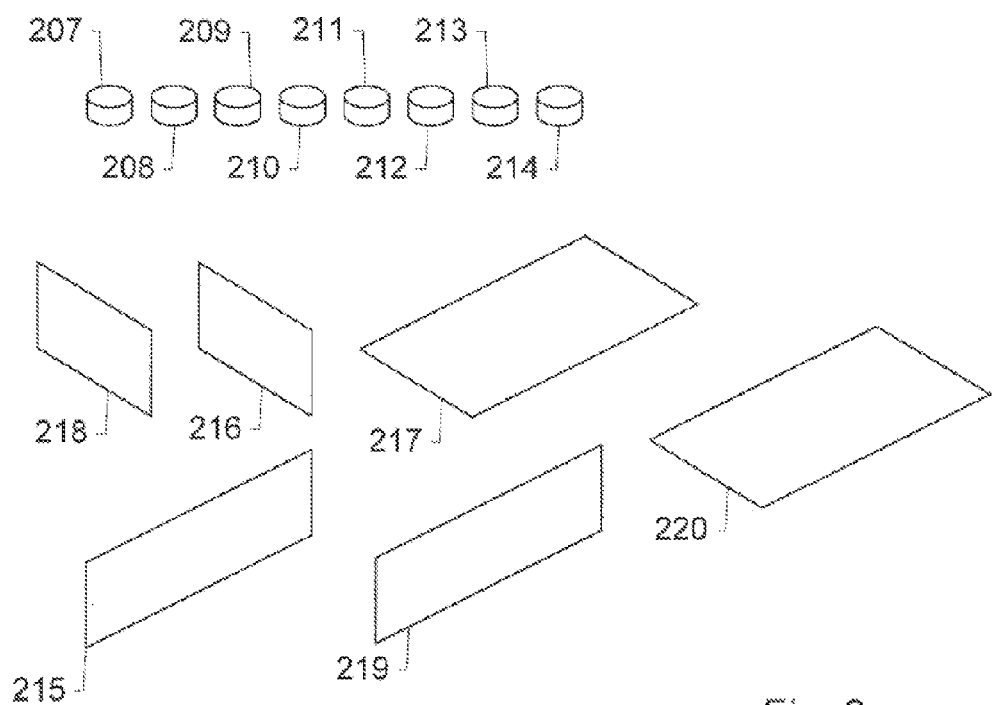
FIG. 2c shows an example of a number of parts of a component of a computer model, according to an embodiment of the invention.

FIG. 2a shows an example of a computer model 201 according to an embodiment of the present invention. In this example the computer model 201 represents a toy model built from construction elements of a toy construction system. The computer model is built from six like components 202; however in other embodiments the number and type of components may differ. The six components are positioned on top of each other creating a triangular model. FIG. 2b shows an example of a component 202 of a computer model 201 according to an embodiment of the present invention. The component 202 represents a toy construction element. The toy construction element 202 comprises six rectangular sides 215, 216, 217, 218, 219, 220 and eight cylinders protruding from the top 207, 208, 109, 110, 111, 112, 113, 114. FIG. 1c shows an example of a number of parts of a component according to an embodiment of the present invention. Eight cylinders 107, 108, 109, 110, 111, 112, 113, 114 and six rectangles are shown 215, 216, 217, 218, 219, 220. Table 1 shows possible face counts for the different parts.

TABLE 1

| | Reference number | | | | | | | |
| --- | --- | --- | --- | --- | --- | --- | --- | --- |
| | 101 | 102 | 107 | 108 | 109 | 110 | 111 | 112 |
| Number of faces | 9288 | 1548 | 192 | 192 | 192 | 192 | 192 | 192 |

| | Reference number | | | | | | | |
| --- | --- | --- | --- | --- | --- | --- | --- | --- |
| | 213 | 214 | 215 | 216 | 217 | 218 | 219 | 220 |
| Number of faces | 192 | 192 | 2 | 2 | 2 | 2 | 2 | 2 |

Figure 3:
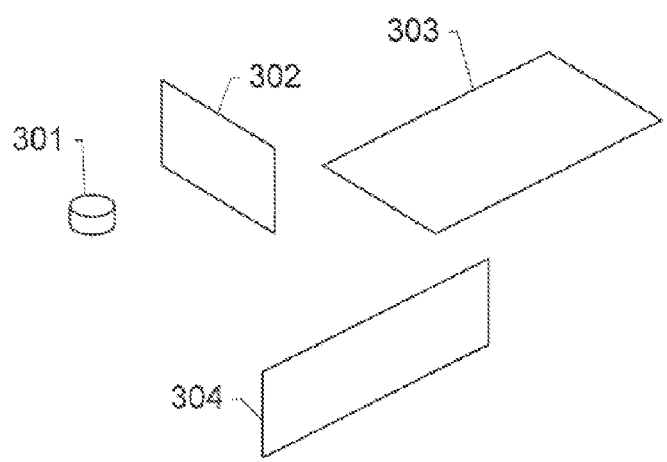
FIG. 3 shows an example of a number of parts of a component of a computer model, according to an embodiment of the invention.

FIG. 3 shows a number of parts of a component according to an embodiment of the represent invention. The component in this example is the toy construction element shown in FIG. 2b. A cylinder 301 and three rectangles 302, 303, 304 are shown. In this example only unique parts are saved.

Figures 7A, 7B:
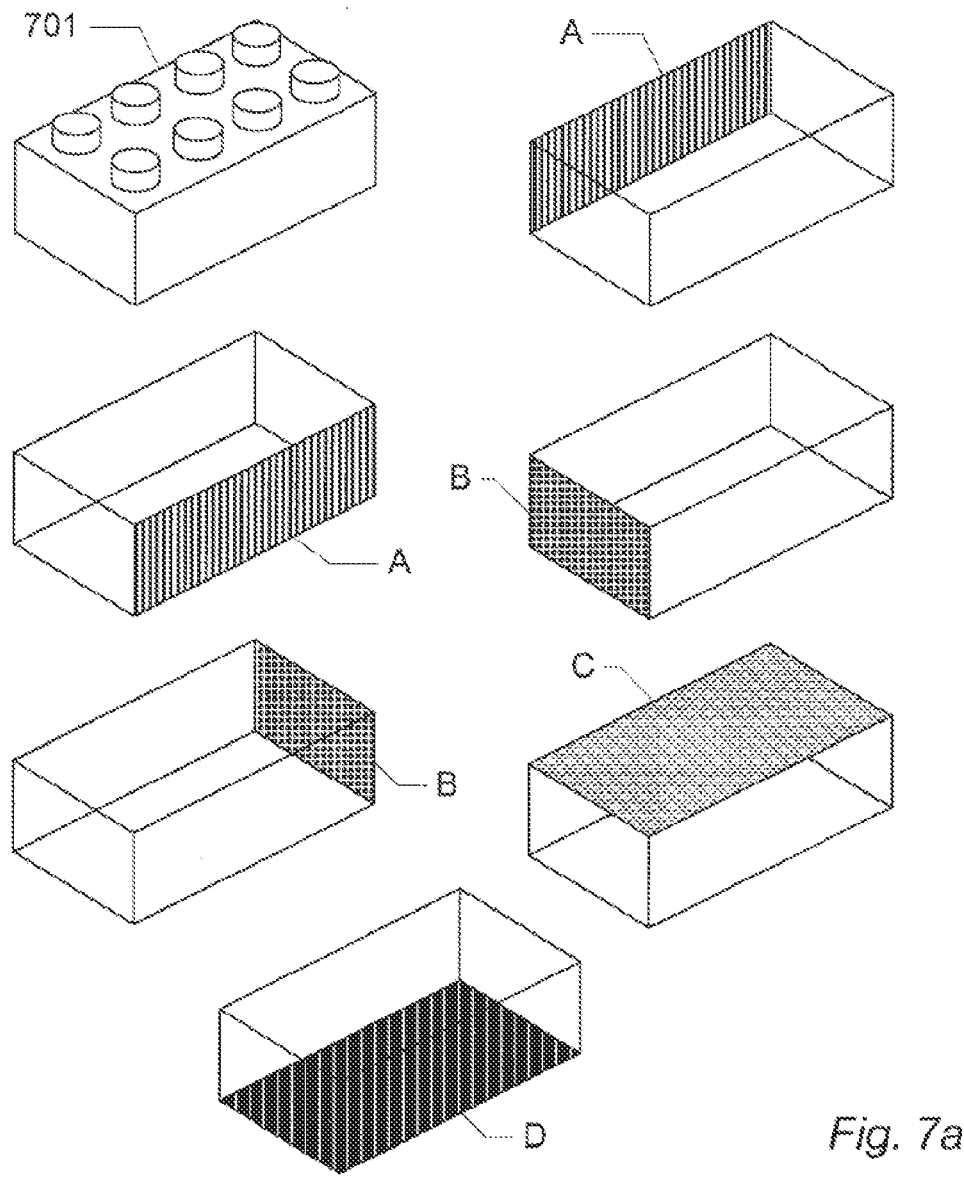
FIG. 7a shows connection zones defined in relation to a component.
FIG. 7b shows the compatibility of connection zones.

FIG. 7a show examples of connection zones associated with a component, according to an embodiment of the present invention. The connection zones determine how the component can be connected to other components. In this example six connection zones are associated with the component; however any number of connection zones may be defined. A connection zone of type A is associated with the front and back of the component, a connection zone of type B is associated with the left and right side of the component, a connection zone of type C is associated with the top of the component and a connection zone of type D is associated with the bottom of the component. The different types of connection zones are selectively compatible with other types of connection zones. FIG. 7b shows an example of a table of the compatibility of the connection zones defined in FIG. 7a. Connection zone A is compatible with connection zones A, B, and D, connection zone B is compatible with connection zones A, B and D, connection zone C is compatible with connection zone D, and connection zone D is compatible with connection zones A, B, C and D. The connection zones may be used to determine the spatial relationship between different components.

Figure 8D:
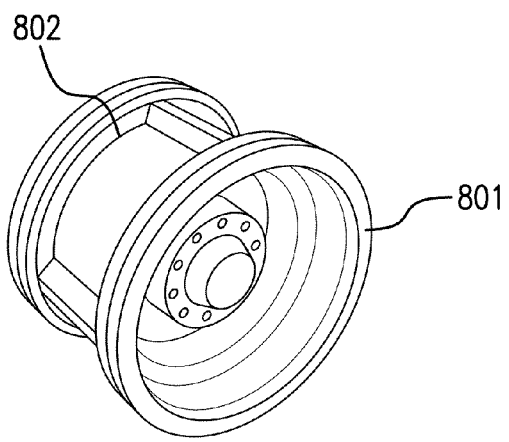
FIG. 8d shows an example of a round connection zone.
Figure 8E:
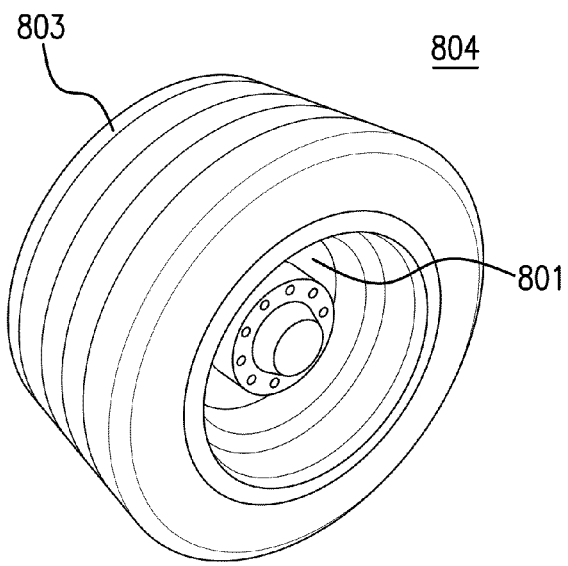
FIG. 8e shows a computer model comprised of two components, a rim and a tyre.

FIG. 8 shows another example of connection zone of a component according to an embodiment of the present invention. In this example connection zones are only defined at the positions where the toy construction elements represented by the components, may be connected with each other by a frictional fit or another physical connection. FIG. 8b shows the compatibility of the connection zones. FIG. 8c shows an example of connection zones associated with a component. In this example a number of connection zones are placed side by side on the top and bottom of the component. FIG. 8d shows an example of a round connection zone. The figure shows a component representing a rim 801. The rim 801 has a single round connection zone 802 associated. FIG. 8e shows a computer model 804 comprised of two components, a rim 801 and a tyre 803, connected to the rim 801.

Figure 4A:
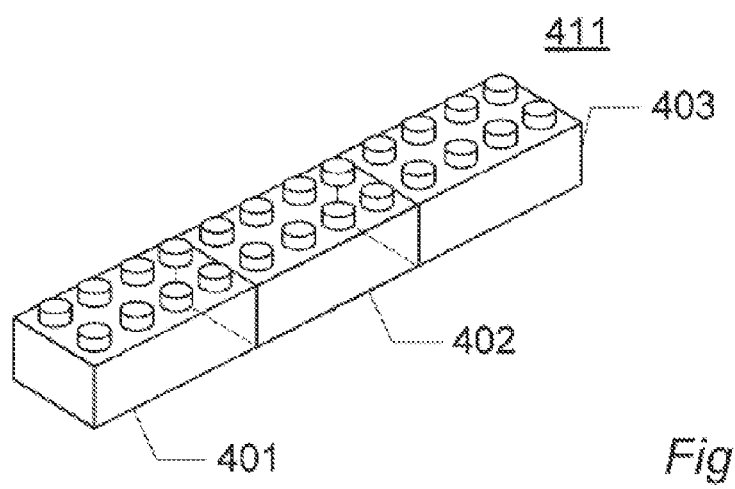
FIG. 4a shows a computer model comprising a number of components prior to optimization.
Figure 4B:
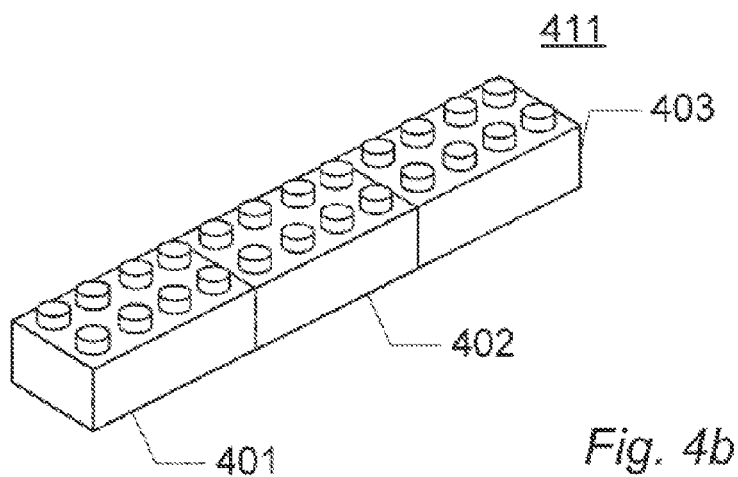
FIG. 4b shows a computer model comprising a number of components after optimization.

FIG. 4 shows an embodiment of the present invention used to optimize a computer model of a toy model. FIG. 4a shows the toy model before optimization and FIG. 4b shows the toy model after optimization. The toy model is built from three toy building bricks 401, 402, 403 positioned side by side. In this embodiment each toy brick represents a physical component of the model; however in other embodiments the components may be defined in other ways e.g. a first component may be defined as the two toy building bricks 401 402 and a second component may be defined as the toy building brick 403 or a first component may be defined as a first group of faces of the toy building brick 401 and a second component may be defined as a second group of faces of the toy building brick 401. In this example each component 401, 402, 403 is composed of the parts shown in FIG. 1c, with the number of face shown in table I. For each of the components 401, 402, 403 a set of six connection zones are associated as shown in FIG. 7a-b. Before the optimization step each of the components 401, 402, 403 comprise 1546 faces, resulting in 4644 faces for the whole model. To optimize the model the spatial relationship between the components 401, 402, 403 are determined. This may be achieved by using the connection zones of the components. A first step may be to determine if any connection zones are in a predetermined relative orientations. In this example two type B connection zones of component 401 and 402 and two type B connection zones of component 402 and 403 are in contact. From the table in FIG. 7b it can be seen that a connection zone of type B is compatible with itself. Next the type of connection between the connection zones is determined. Using the determined spatial relationship between the components 401, 402, 403 a number of parts of each of the components are chosen. In this example the part 218 can be left out when representing component 401, the parts 216, 218 can be left out when representing component 402 and the part 216 can be left out when representing component 403. The entire model can therefore be represented with 4636 faces after the optimization compared to 4644 faces before the optimization Table 2 shows face for model before and after optimization.

TABLE 2

| Reference number | 411 | 401 | 402 | 403 |
| --- | --- | --- | --- | --- |
| Number of faces after optimization | 4636 | 1546 | 1544 | 1546 |
| Number of faces unoptimized | 4644 | 1548 | 1548 | 1548 |

Figure 5A:
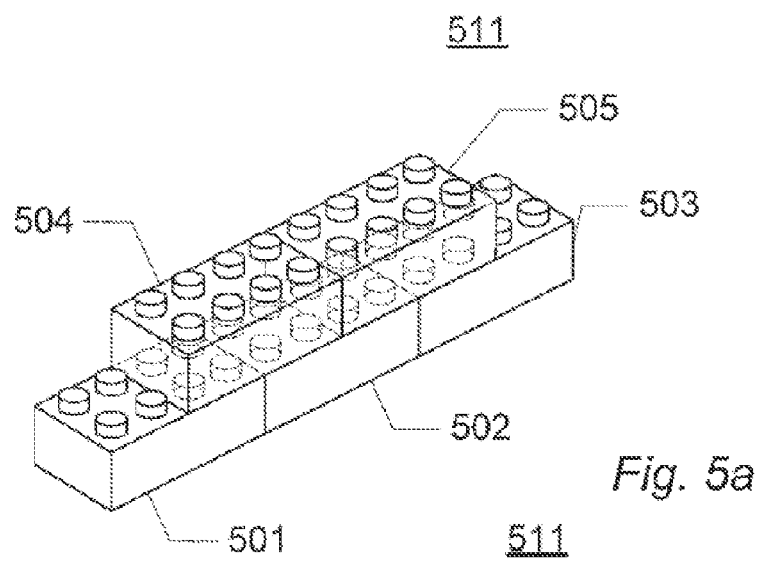
FIG. 5a shows a computer model comprising a number of components prior to optimization.
Figure 5B:
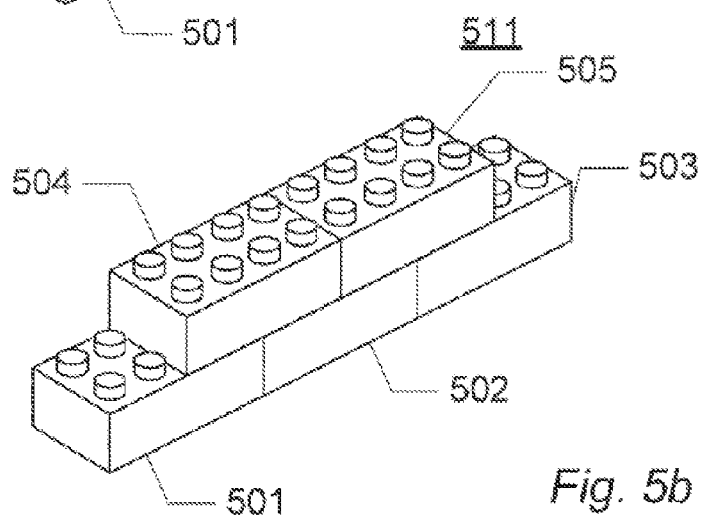
FIG. 5b shows a computer model comprising a number of components after optimization.

FIG. 5 shows an embodiment of the present invention used to re-optimize a model after a structural change. The model 510 is the model shown is FIG. 4 411 with the addition of two components 504, 505 of the same type as the component 501, 502, 503. The two component 504, 505 is positioned on top of the three underlying components 501, 502, 503. To determine the spatial relationship between the components, the spatial relationship between the connection zones is examined. The examination of the spatial relationships between three original components 501, 502, 503 may be skipped since they already have been optimized. The component 504 has a type D connection zone in contact with two type C connection zones of components 501, 502, and a type B connection zone in contact with a type B connection zone of component 505. From the table in FIG. 7b it can be seen that a type D connection zone is compatible with a type C connection zone and a type B is compatible with a type B. In this example a partial connection exist between components 504, 501 and 504, 502 and a full connection exist between components 504, 505. The component 505 has a type D connection zone in contact with two type C connection zones of components 502, 503, and a type B connection zone in contact with a type B connection zone of component 504. From the table in FIG. 7b it can be seen that a type D connection zone is compatible with a type C connection zone. Again a partial connection exist between both components 505, 502 and 505, 503. Using the determined spatial relationship between the components a number of parts for each component can be chosen to represent the component. For component 501 parts 207, 208, 211, 212, 215, 216, 217, 219, 220 are used, for component 502 parts 215, 219, 220 are used, for component 503 parts 209, 210, 213, 214, 215, 218, 219, 220 are used, for component 504 parts 207, 208, 209, 210, 211, 212, 213, 214, 215, 216, 217, 219 are used, and for component 505 parts 207, 208, 209, 210, 211, 212, 213, 214, 215, 217, 218, 219 are used. It should be noted that part 209 is still used to represent component 503 even thou the part is not visible in FIG. 5b. This is because the part is not hidden as a result of the spatial relationship between the components of the model, but the spatial relationship between the model and the virtual camera. The whole model can be represented using 4650 faces compared to 7740 before optimization, corresponding to a 39.9% reduction in number of faces. Table 3 shows face counts for the model before and after optimization.

TABLE 3

| | Reference number | | | | | |
|---|---|---|---|---|---|---|
| | 511 | 501 | 502 | 503 | 504 | 505 |
| Number of faces after optimization | 460 | 778 | 6 | 778 | 1544 | 1544 |
| Number of faces partially optimized | 7732 | 1546 | 1544 | 1546 | 1548 | 1548 |
| Number of faces unoptimized | 7740 | 1548 | 1548 | 1548 | 1548 | 1548 |

Figure 6A:
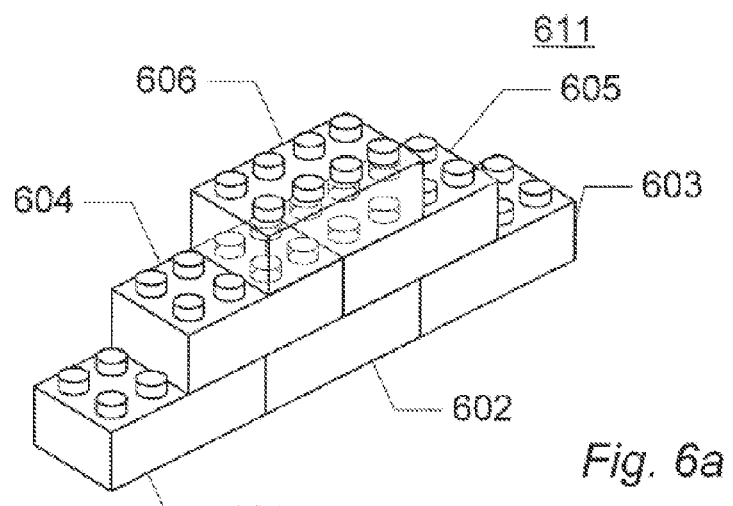
FIG. 6a shows a computer model comprising a number of components prior to optimization.
Figure 6B:
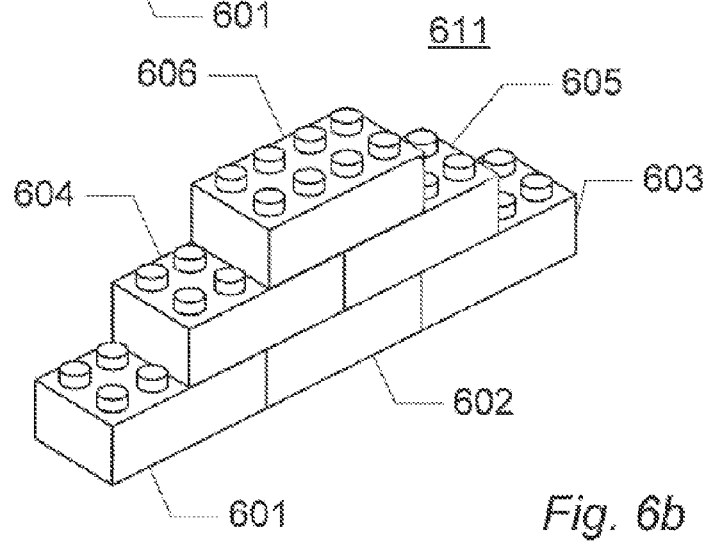
FIG. 6b shows a computer model comprising a number of components after optimization.

FIG. 6 shows another example of re-optimization of a model where a structural change has occurred according to an embodiment of the present invention. The model 611 is the model 511 from FIG. 5 with the addition of another component of the same type as the components 601, 602, 603, 604, 605. The component 606 is positioned on top of components 604, 605. To determine the spatial relationship between the components the spatial relationship between the connection zones is examined. The examination of the relationships between the connection zones of the five original components 601, 602, 603, 604, 605 may be skipped as they already have been optimized. The component 606 has a type D connection zone in contact with two type C connection zones of components 604, 605. From the table in FIG. 7b it can be seen that a type D connection zone is compatible with a type C connection zone. A partial connection exist between both components 606, 604 and 606, 605. Using the determined spatial relationship between the components a number of parts for each components can be chosen to represent the component. For component 601 parts 207, 208, 211, 212, 215, 216, 217, 219, 220 are used, for component 602 parts 215, 219, 220 are used, for component 603 parts 209, 210, 213, 214, 215, 217, 218, 220 are used, for components 604 parts 207, 208, 211, 212, 215, 216, 217, 219 are used, for component 605 parts 209, 210, 213, 214, 215, 217, 218, 219 are used, and for component 606 parts 207, 208, 209, 220, 211, 212, 213, 214, 215, 216, 217, 218, 219 are used. As is the case in the last example it should be noted that part 209 is still used to represent both component 603 and 605 even thou the part is not visible in FIG. 6b. The whole model can be represented using 4660 faces compared to 9288 before optimization corresponding to a 49.8% reduction in number of faces. Table 4 shows face counts for the model before and after optimization.

TABLE 4

| | Reference number | | | | | | |
|---|---|---|---|---|---|---|---|
| | 611 | 601 | 602 | 603 | 604 | 605 | 606 |
| Number of faces after optimization | 4660 | 778 | 6 | 778 | 776 | 776 | 1546 |
| Number of faces partially optimized | 6198 | 778 | 6 | 778 | 1544 | 1544 | 1548 |
| Number of faces unoptimized | 9288 | 1548 | 1548 | 1548 | 1548 | 1548 | 1548 |

It can be seen from the examples that the method becomes more effective for complex models. This is a highly useful effect of the method as it is for complex models the optimization is especially important.

Figure 9A:
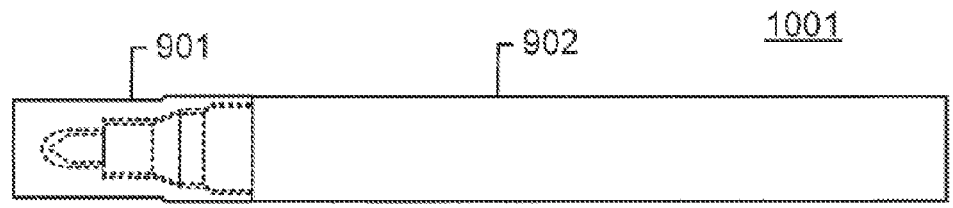
FIG. 9a shows an example of a computer model comprising a number of components.
Figure 9B:
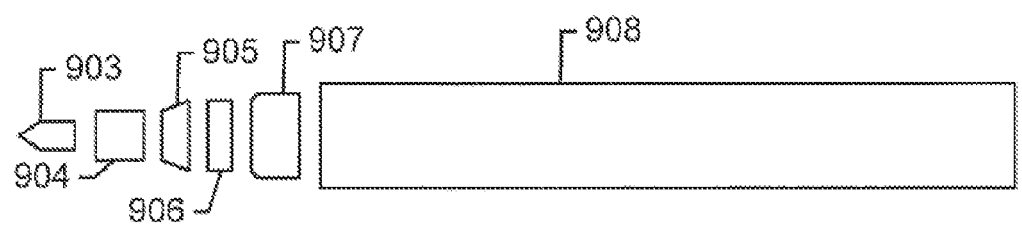
FIG. 9b shows an example of a number of parts of a component of a computer model, according to an embodiment of the invention.
Figure 9C:
FIG. 9c shows an example of a number of parts of a component of a computer model, according to an embodiment of the invention.

FIG. 9a shows another example of a computer model 1001, according to an embodiment of the invention. The computer model 1001 represents a marker. The computer 1001 comprises two components 901 corresponding to the cover of the marker and 902 corresponding to the body of the marker. FIG. 9b shows a possible way to divide the marker body 902 up into parts. The tip of the marker body is divided into 5 parts 903, 904, 905, 906, 907 and the holding portion of the marker body 908 is represented using a single part 908. FIG. 9c shows an example of how the cover of the marker 901 can be divided into parts. The outer part of the cover is represented by a part 909 and the inner portion of the cover is represented by a part 910.

FIG. 10 shows an example of how an embodiment of the method of the present invention can be used to optimize the computer model shown in FIG. 9. By examining the spatial relationship between the two components 1002 and 1003 the method is able to determine that parts 903, 904, 905, 906, 907, 910 are hidden from all perspectives. This may be achieved by examining occlusion zones and/or connection zones of the components 1002 1003. The parts can therefore be left out as shown in figure b showing the computer model after optimization.

FIG. 11 shows another example of how an embodiment of the method of the present invention can be used to optimize the computer model described in relation to FIG. 9. By examining the spatial relationship between the two components 1002 and 1003 the method is able to determine that no parts are hidden from all perspectives. As a result no parts are therefore left out and the computer model after optimization shown in FIG. 11b is equal to the computer model shown in FIG. 11a before optimization.

Figure 12:
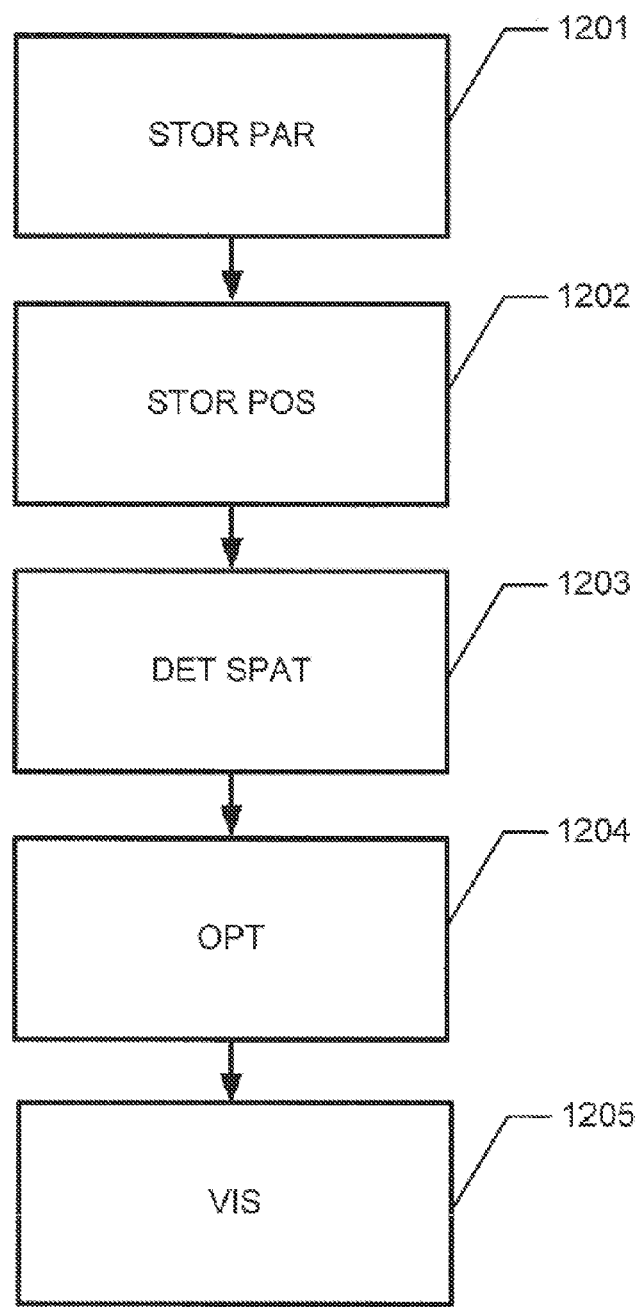
FIG. 12 shows a flow diagram of a method for visualising/rendering a computer model according to an embodiment of the present invention

FIG. 12 shows a flow diagram of a method for visualising/rendering a computer model according to an embodiment of the present invention. The computer model is defined to be composed of a number of components and each component is defined to be composed of a number of parts. Embodiments of the method of the present invention selectively choose a number of parts for each of the components to be used for visualising/rendering the model. In the first step of the method 1201 a number of parts of a component are stored. This means that the way a component can be cyptimized is determined by how the component is divided into parts. In the next step 1202 the position and orientation of the components are stored. The position may be stored in any coordinate system. Next the stored position of the components are used to determine the spatial relationship in step 1203 between the components. The spatial relationship may be determined by examining connection zones of the components, where determining the spatial relationship may include determining a connectivity property of the components, e.g. by determining connection zones of one component that are connected to a compatible connection zone of the other component. WO2004034333 discloses a method for determining the spatial relationship between components. The determined spatial relationship of the components is then used to choose a number of parts for each component to use for visualising/rendering the component in step 1204 and using the determined parts the model is visualised/rendered in step 1205.

Figure 13:
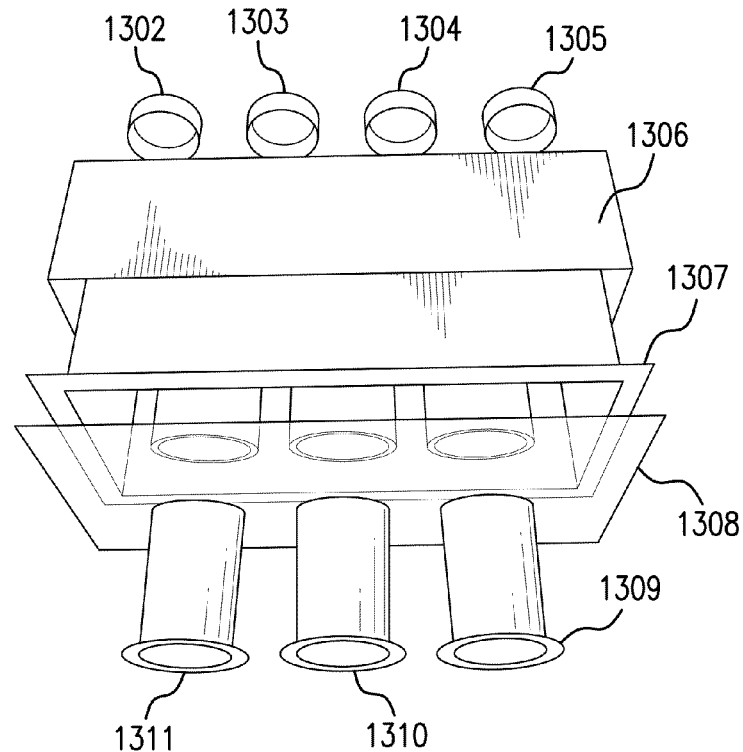
FIG. 13 shows an example of a number of parts of a component of a computer model, according to an embodiment of the invention.
Figure 14:
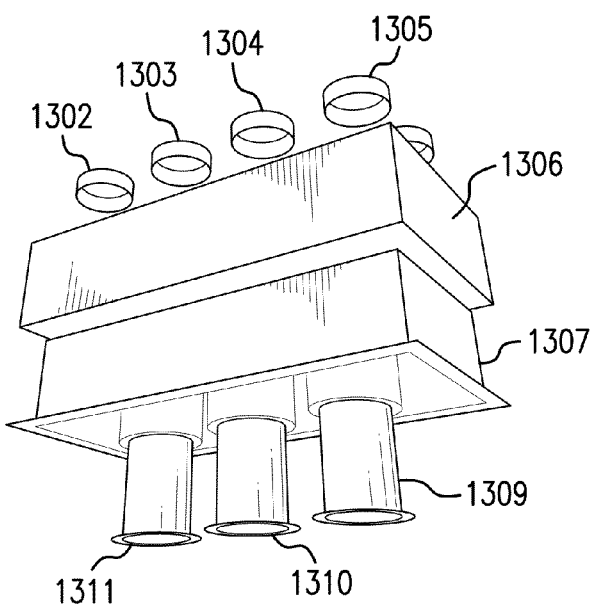
FIG. 14 shows an example of a number of parts of a component of a computer model, according to an embodiment of the invention.

FIGS. 13 and 14 show a number of parts used for representing a component according to an embodiment of the invention. In this example the component is a toy building brick. Eight parts 1302, 1303, 1304, 1305 are used for representing knobs of the toy building brick, one part is used for representing the outer casing 1306 of the brick, two parts are used for representing the inner casing of the brick 1307, 1308 and three parts are used for representing cylinders underneath the brick 1309, 1310, 1311.

Figures 15A, 15B:
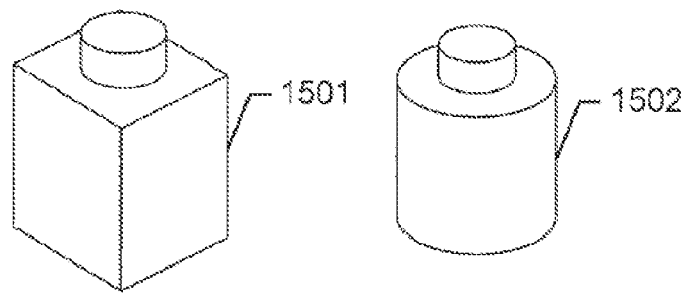
FIGS. 15a-f show examples of components, parts and occlusion zones according to an embodiment of the present invention.
Figure 15C:
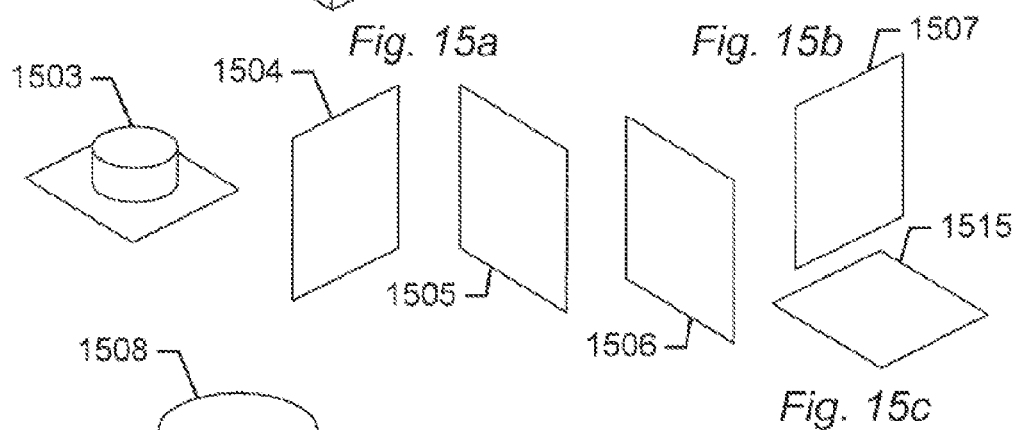
Figure 15D:
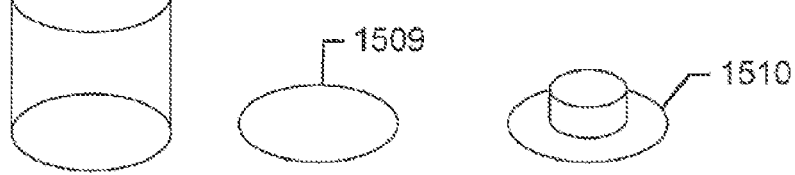
Figure 15E:
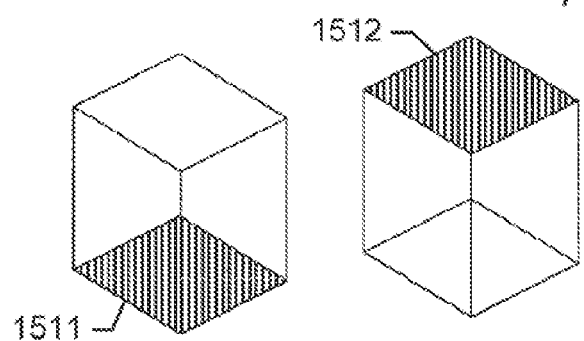
Figure 15F:
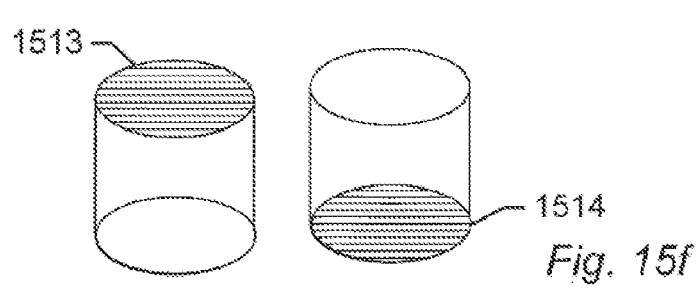

FIG. 15*a* shows a component 1501 according to an embodiment of the present invention. The component 1501 represents a square toy construction element. FIG. 1*b* shows a component 1502 according to an embodiment of the present invention. The component 1502 represents a cylindrical toy construction element. FIG. 1*c* shows parts 1503, 1504, 1505, 1506, 1507, 1515 of the component 1501. FIG. 1*d* shows parts 1508, 1509, 1510 of the component 1502. FIG. 15*e* shows two occlusion zones 1511, 1512 of a specific type associated with the component 1501. The occlusion zones 1511, 1512 are preferably positioned at the portion of a component where the component may be connected to other components. In this example the occlusion zones 1511, 1512 are positioned at the top and bottom of the component 1501. These positions corresponds to the portions of the toy construction element the component 1501 represents, that can be connected to other toy construction elements. The type of the occlusion zones may be dependent of their shape and/or size. In this example the occlusion zones 1511, 1512 are square occlusion zones. The occlusion zones may be linked one or more parts of their component. In this example occlusion zone 1512 is linked to part 1503 and occlusion zone 1511 is linked to part 1515. FIG. 15*f* shows two occlusion zones 1513, 1514 of a specific type associated with component 1502. In this example the occlusion zones 1513, 1514 are positioned at the top and bottom of the component 1502. These positions corresponds to the portions of the toy building brick the component 1502 represents, that can be connected to other toy construction elements. In this example the occlusion zones 1513, 1514 are round. In this example occlusion zone 1513 is linked to part 1510 and occlusion zone 1514 is linked to part 1509.

Figure 16:
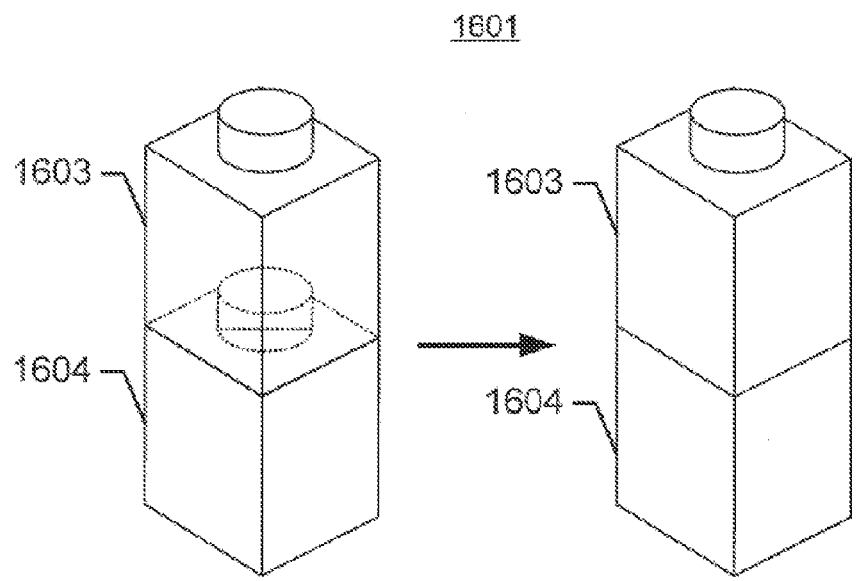
FIG. 16 shows an example of computer model optimization according to an embodiment of the present invention.

FIG. 16 shows an example of model optimization according to an embodiment of the present invention. The computer model 1601 represent a toy model build of two square toy construction elements 1603, 1604. In this example each toy construction element 1603, 1604 corresponds to a component, and each component is comprised of the parts 1503, 1504, 1505, 1506, 1507, 1515 shown in FIG. 15*c*. Each component further has two occlusion zones 1511, 1512 associated as shown in FIG. 15*e*. To optimize the computer model 1601 the spatial relationship between the occlusion zones of the two components 1603, 1604 are examined. By examining the distance between occlusion zone 1511 of component 1603 and occlusion zone 1512 of component 1604, and their orientation in relation to each other, the method are able to determine that the two occlusion zones are in contact. When two occlusion zones are in contact a logical rule may be used to determine if one occlusion zone occludes the other and if any parts linked to any of the occlusion zones can be left out for visualising/rendering the component. In this example a possible logic rule may be:

1. A square occlusion zone of size X occludes round and square occlusion zones of size smaller or equal to X.
2. A round occlusion zone of size Y occludes round occlusion zones of size smaller or equal to Y.
3. Parts linked to an occluded occlusion zone can be left out when visualising/rendering a component.

Using logic rule 1 the method is able to determine that occlusion zone 1511 of part 1603 occludes occlusion zone 1512 of part 1604 and occlusion zone 1512 of part 1604 occludes occlusion zone 1511 of part 1603. Thereby the optimized model 1602 can be represented without using part 1515 for representing component 1603 and part 1503 to represent part 1604.

Figure 17:
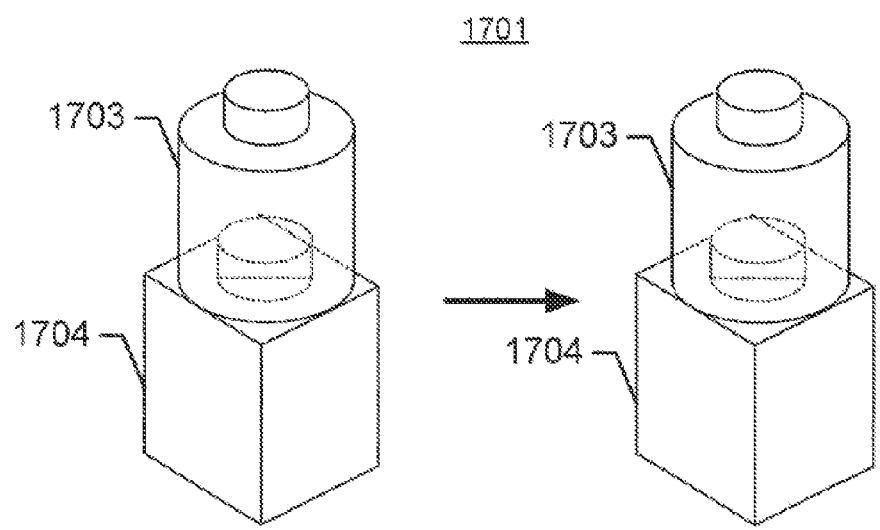
FIG. 17 shows an example of computer model optimization according to an embodiment of the present invention.

FIG. 17 shows an example of model optimization according to an embodiment of the present invention. The computer model 1701 represents a toy model build of a square toy construction element 1704 and a round toy construction element 1703. In this example each toy construction element 1703, 1704 corresponds to a component. The square toy construction element is comprised of the parts 1503, 1504, 1505, 1506, 1507, 1515 shown in FIG. 15*c* and the round toy construction element is comprised of the part 1508, 1509, 1510 shown in FIG. 15*d*. The square toy construction element 1704 has two occlusion zones 1511, 1512 associated as shown in FIG. 15*e*, and the round toy construction element 1703 has two occlusion zones 1513, 1514 associated as shown in FIG. 15*f*. To optimize the computer model 1601 the spatial relationship between the occlusion zones of the two components 1703, 1704 are examined. In this example occlusion zone 1514 of component 1703 and occlusion zone 1512 of component 1704 are found to be in contact. Using the three previously stated logic rules the method determines that the square occlusion zone 1512 of component 1704 occludes the round occlusion zone 1514 of component 1703 however the round occlusion zone 1514 of component 1703 does not occlude the square occlusion zone 1512 of component 1704. Thereby the optimized computer model 1702 can be represented without using part 1509 for representing component 1703 however the full number of part still needs to be used for representing component 1704.

Figure 23A:
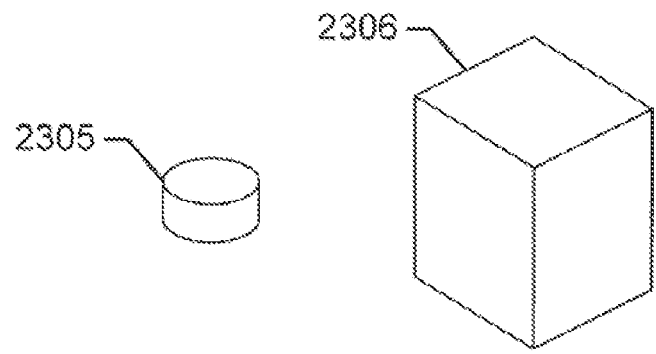
FIG. 23a-b shows examples of parts and occlusion zones according to an embodiment of the present invention.
Figure 23B:
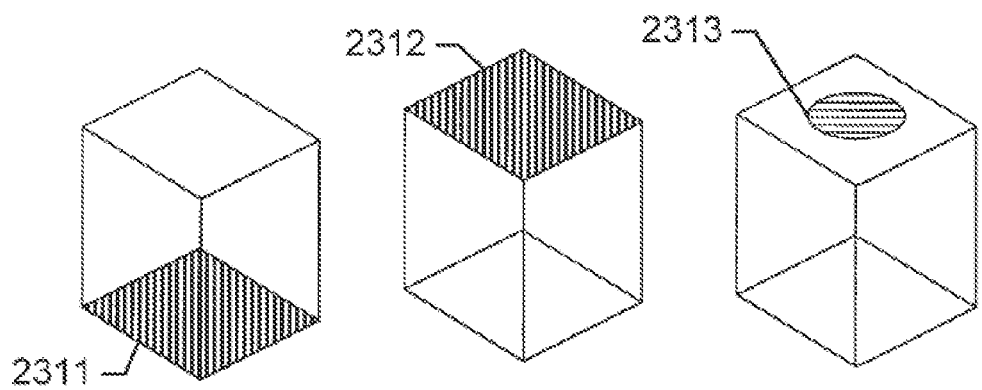

FIG. 23*a* shows an example according to an embodiment of the present invention of how a component can be divided into parts. The component the parts represent is the square toy construction element 1501 shown in FIG. 1*a*. In this example the cylinder 2305 and the box 2306 is represented using a part. FIG. 23*b* shows an example according to an embodiment of the present invention, of how occlusion zones can be associated with a component. The occlusion zones in this example are associated with component 1501. Occlusion zones 2311 and 2312 are used for finding parts of other components occluded by the component 1501 and occlusion zone 2313 is used to find part/s of the component 1501 occluded by other components. Occlusion zones 2311 and 2312 are not linked to any parts and occlusion zone 2313 is linked to part 2305.

Figure 23C:
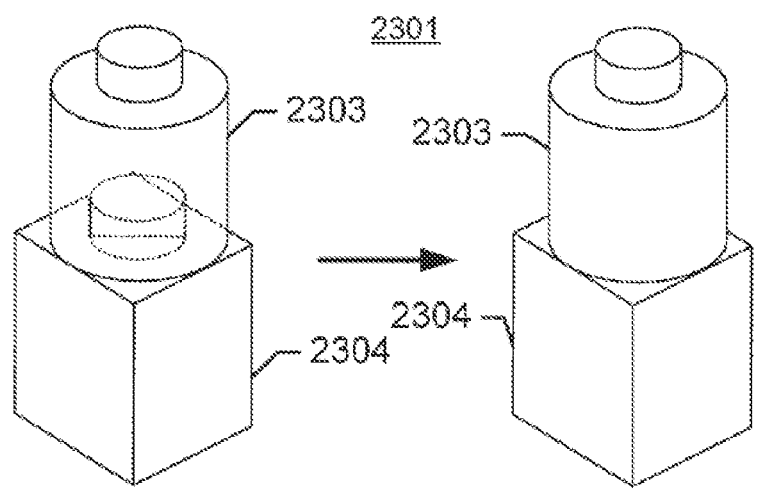
FIG. 23c shows an example of computer model optimization according to an embodiment of the present invention.

FIG. 23*c* shows an example of model optimization according to an embodiment of the present invention. The computer model 2301 represents a toy model build of a square toy construction element 2304 and a round toy construction element 2303. In this example each toy construction element 2303, 2304 corresponds to a component. The square toy construction element is comprised of the parts 2305, 2306 shown in FIG. 23*a* and the round toy construction element is comprised of the part 1508, 1509, 1510 shown in FIG. 15*d*. The square toy construction element 2304 has three occlusion zones 2311, 2312, 2313 associated as shown in FIG. 23*b*, and the round toy construction element 2303 has two occlusion zones 1513, 1514 associated as shown in FIG. 15*f*. To optimize the computer model 2301 the spatial relationships between the occlusion zones of the two components 2303, 2304 are examined. In this example occlusion zone 1514 of component 2303 and occlusion zone 2312 of component 2304 are found to be in contact, and occlusion zone 2313 of component 2304 and occlusion zone 1513 of component 2303 are found to be in contact. Using the three previously stated logic rules the method determines that the square occlusion zone 2312 of component 2304 occludes the round occlusion zone 1514 of component 2303 and the round occlusion zone 1514 of component 2303 occludes the round occlusion zone 2313 of component 2304. Thereby the optimized computer model 2301 can be represented without using part 1509 for representing component 2303 and part 2305 for representing component 2304. In embodiments of the invention a first and second collection of occlusion zone/s may be associated with a component. The first collection of occlusion zone/s may be used to find parts of other components hidden by the component and the second collection of occlusion zone/s may be used to find parts of the component hidden by other components.

Figure 18:
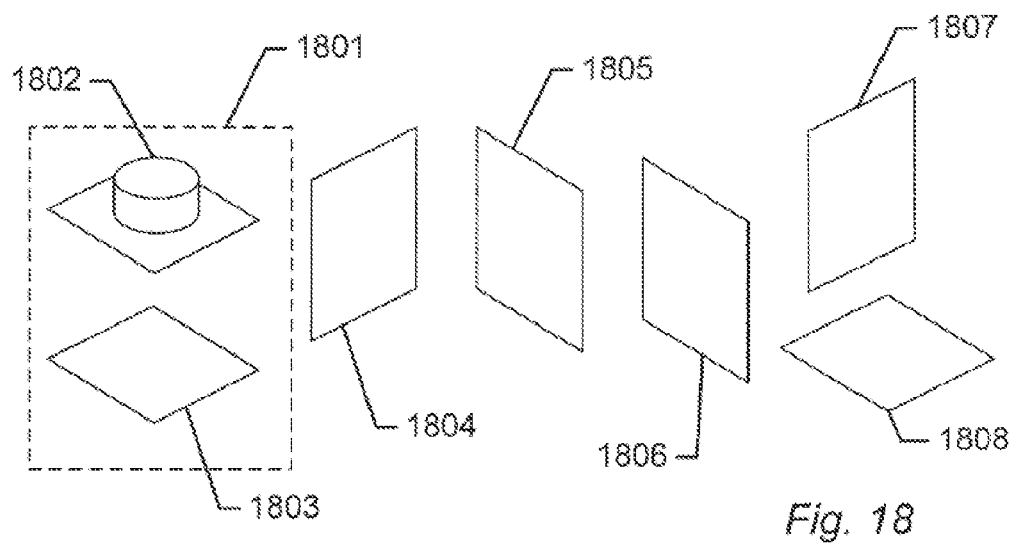
FIG. 18 shows an example of a number of parts of a component of a computer model, according to an embodiment of the invention.

FIG. 18 shows an example of how a component can be divided into parts according to an embodiment of the present invention. The component the parts represent is the square toy construction element 1501 shown in FIG. 15*a*. In this example two parts 1802, 1803 represent a common portion of the component 1501. The first part 1802 corresponds to a square with a cylinder on top and the second part 1803 corresponds to a square. The first part has a higher level of detail than the second part. Therefore fewer computational resources are needed to visualise/render the second part 1803 than the first part 1802. Preferably at most one of the first 1802 or second part 1803 at the time is used for representing the toy construction element 1501. The remaining parts 1804, 1805, 1806, 1807, 1808 corresponds to the parts shown in FIG. 15*c*.

Figure 19:
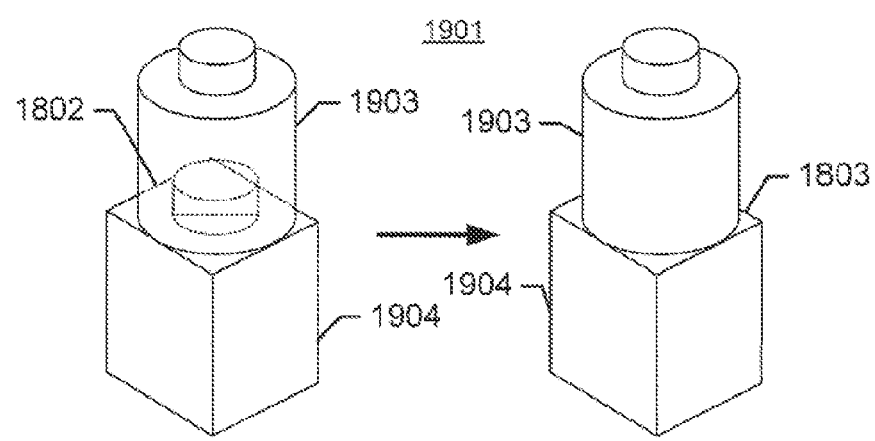
FIG. 19 shows an example of computer model optimization according to an embodiment of the present invention.

FIG. 19 shows an example of model optimization according to an embodiment of the present invention. A computer model 1901 represent a toy model build of a square toy construction element 1904 and a round toy construction element 1903. In this example each toy construction element 1903, 1904 corresponds to a component. The square toy construction element 1904 is represented using the parts 1802, 1803, 1804, 1805, 1806, 1807, 1808 shown in FIG. 18 and the round toy construction element is represented using the parts 1508, 1509, 1510 shown in FIG. 15*d*. The component 1904 has two occlusion zones 1511, 1512 associated as shown in FIG. 15*e* with the difference that occlusion zone 1511 is linked to part 1803 and occlusion zone 1512 is linked to both part 1802 and part 1803. The component 1903 has two occlusion zones 1513, 1514 associated as shown in FIG. 15*f*. To optimize the computer model 1901 the spatial relationships between the occlusion zones of the two components 1903, 1904 are examined. In this example occlusion zone 1514 of component 1903 and occlusion zone 1512 of component 1904 are found to be in contact. When two occlusion zones are found to be in contact a logical rule may be used to determine if one occlusion zone occludes to other and if any parts linked to any of the occlusion zones can be left out for visualising/rendering the component. In this example a possible logic rule may be the following:

1. A square occlusion zone of size X occludes round and square occlusion zones of size smaller or equal to X.

2. A round occlusion zone of size Y occludes round occlusion zones of size smaller or equal to Y.

3. A round occlusion zone of size Y partially occludes a square occlusion zone of size smaller or equal to Y.

4. Parts linked to an occluded occlusion zone can be left out when visualising/rendering a component.

5. If two parts represents a common portion of a component and are linked to an occlusion zone, use the part with the lowest level of detail if the occlusion zone are partially occluded.

6. If two parts represents a common portion of a component and are linked to an occlusion zone, use the part with the highest level of detail if the occlusion zone are not occluded.

Using logic rule 1 and 4 part 1509 can be left out when visualising rendering component 1903 and part 1803 can be used in stead of part 1802 for visualise/render component 1904. Thereby both components 1903 and 1904 can be optimized, further lowering the computational resources needed for visualise/render the computer model 1901. In this example there is no visible loss of using part 1803 instead of part 1802 to visualise/render component 1904, however in other embodiment various visual loss may occur.

Figure 20:
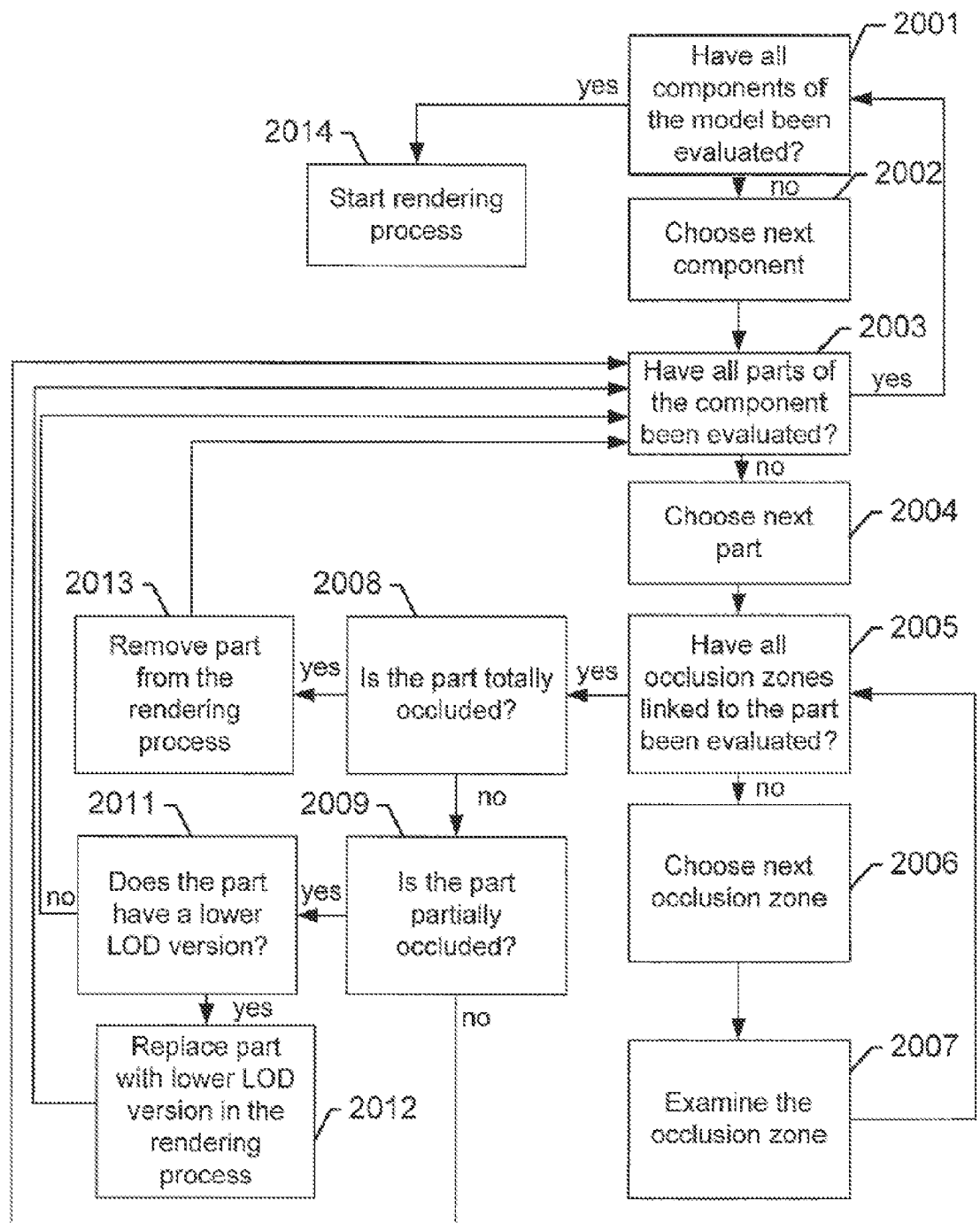
FIG. 20 shows a flow diagram of a method for visualising/rendering a computer model according to an embodiment of the present invention

FIG. 20 shows a flowchart of a method for visualising/rendering a computer model according to an embodiment of the present invention. In step 2001, the method determines if all components of the model have been evaluated. If the answer is no the method continues at step 2002 by choosing the next component. In step 2003 the method determines if all part/s of the chosen component have been examined. If the answer is no, the method chooses the next part in step 2004. In step 2005 the method determines if all occlusion zones linked to the part have been examined. If the answer is no, the method chooses the next occlusion zone in step 2006. Next, in step 2007 the method examines the chosen occlusion zone. The method may examine the occlusion zone by determining the spatial relationship between the chosen occlusion zone and any other occlusion zones of other components. The spatial relationship may be determined by examining the distance between the chosen occlusion zone and other occlusion zones. If the distance between two occlusion zones is within a predetermined range, the occlusion zones may be determined to be in contact. Additionally the occlusion zone's relative orientation may be used to determine if they are in contact. Two occlusion zones do not need to be physically in contact to be classified as being in contact, they may just be in proximity of each other. When two occlusion zones are found to be in contact, a logic rule may be applied to determine if and how they occlude each other. An occlusion zone may be totally occluded or partially occluded as described in relation to FIG. 19. After the method has finished examining the chosen occlusion zone in step 2007, it returns to step 2005 to examine if all occlusion zones linked to the part have been examined. If the answer is yes, the method goes to step 2008 where it determines if the chosen part is totally occluded. If the answer is no, the method goes to step 2009, where it determines if the part is partially occluded. If the answer again is no the method return to step 2003. In step 2009, if the answer is yes, the method determines if the part has a lower level of detail version in step 2011. A lower level of detail version may be a version of the part having less details, e.g. if the part represents the top of a toy construction element composed of a square with a protruding cylinder on top, a lower level of detail version of the part may simply be the square without the cylinder. If the answer in no the method returns to step 2003. If the answer is yes, the method replaces the part with a lower level of detail version in the rendering process and returns to step 2003. In step 2008 if the method determines that the chosen part is totally occluded it removes the chosen part in step 2013 and returns to step 2003. If the method in step 2003 determines that all parts of the chosen component have been evaluated it returns to step 2001. In step 2001 if the method determines that all components of the model have been evaluated, the method start the visualisation/rendering process in step 2014 and generates a representation of the model. The representation may be a 2 dimensional perspective view of the model. The 2 dimensional perspective view of the model may be directly shown on the screen and/or saved to a digital file.

In the example of FIG. 20, the process determines the spatial relationship between two components directly based on the occlusion zones. In an alternative embodiment, the process may determine the spatial relationship at least partly based on connection zones as described herein. In particular, in one embodiment, each part of a component may have one or more connection zones and one or more occlusion zones associated with it. For example, a first part may have one or more connection zones associated with it and each connection zone may have an occlusion zone associated with it. If at least a first connection zone linked to the first part is connected to a compatible connection zone of another component, the process determines whether (and/or to what degree), the part is occluded due to the connection. To this end, the process determines whether the occlusion zone linked to the connection zone of the other component occludes the occlusion zone linked to the first connection zone, e.g. as described above.

Hence, in some embodiments the process determines that a part is not to be used for visualising/rendering a component, if the part has a first connection zone associated with it that is connected to a second connection zone of another component, if the second connection zone has a second occlusion zone associated with it that occludes a first occlusion zone associated with the first connection zone.

Figure 21:
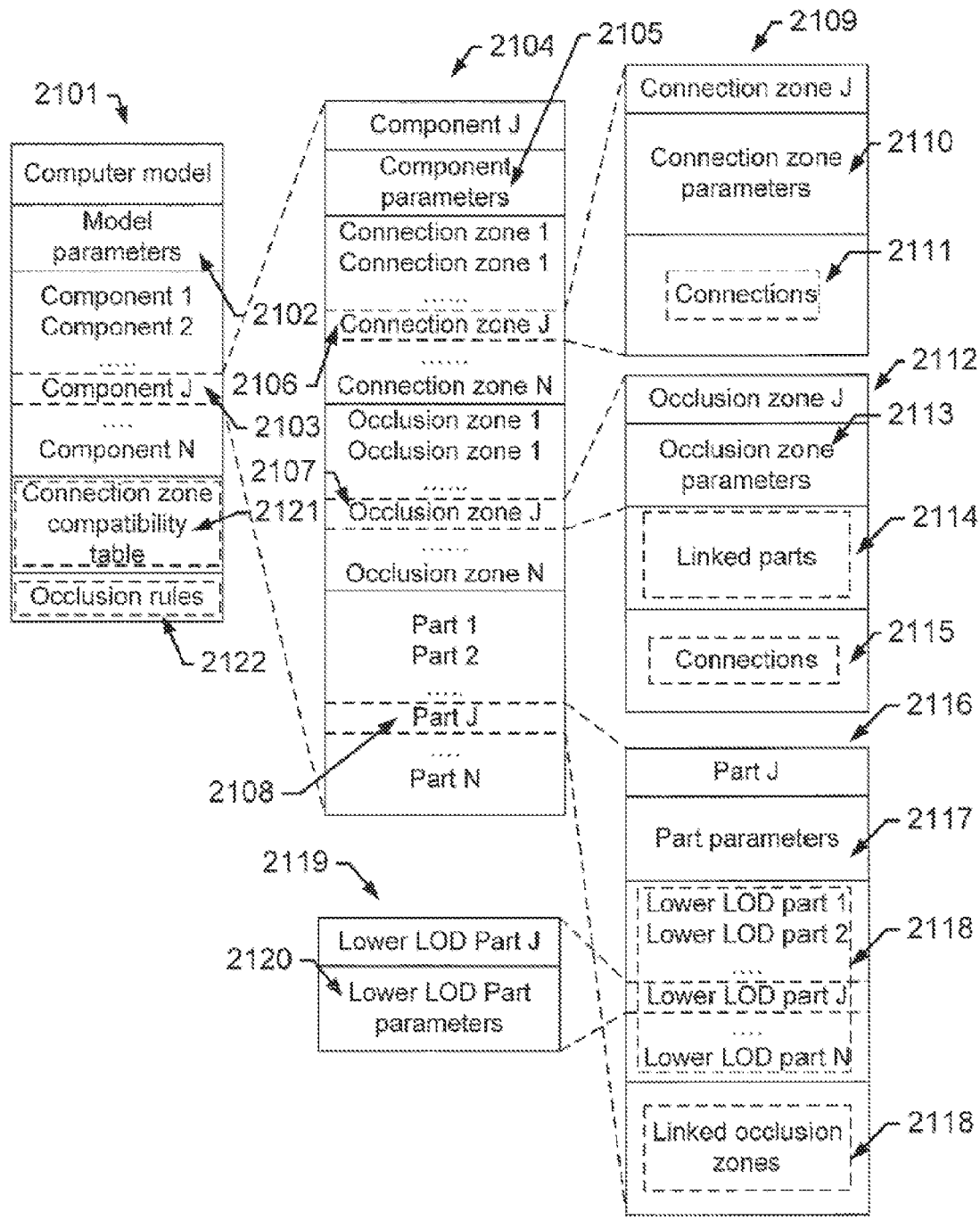
FIG. 21 shows an example of a data structure according to an embodiment of the present invention.

FIG. 21 shows a data structure of a computer model according to an embodiment of the present invention. A data structure of a computer model may comprise model parameters 22 and a number of components and optionally a connection zone compatibility table 2121 and a number of occlusion rules 2122. The model parameters 22 may comprise information related to the position and orientation of the model in a suitable coordinate system. The model parameters 22 may further be animated over time. A connection zone compatibility table 2121 may contain information related to the compatibility of the different types of connection zones e.g. the table shown in FIG. 7b. Occlusion rules may define how different types of occlusion zones occlude each other e.g. the previously stated logic rules. A data structure of a component 2104 may comprise component parameters 2105, a number of connection zones 2106, a number of occlusion zones 2107 and a number of parts 2108. The component parameters 2105 may comprise information related to the position and orientation of the component. A data structure of a connection zone 2109 may comprise connection zone parameters 2110 and optionally information of connections made with connection zones of other components 2111. The connection zone parameters 2110 may comprise information related to the position, orientation, shape and type of the connection zone. A data structure of an occlusion zone 2112 may comprise occlusion zone parameters 2113 and optionally information indicative of parts linked to the occlusion zone 2114 and connections of the occlusion zone with other occlusion zones of other components 2115. The occlusion zone parameters 2113 may comprise information related to the position, orientation, shape and type of the occlusion zone. A data structure for a part 2116 may comprise part parameters 2117 and optionally a number of lower level of detail parts 2118 and information indicative of occlusion zones linked to the part 2118. Part parameters 2117 may comprise information related to the position, orientation and shape of the part. A data structure for a lower level of detail the position, orientation and shape of the Lower LOD part.

Generally, in some embodiments, the connection zones of components of a composite product that provide connections to other components may be arranged in a regular structure, e.g. a regular 2D grid where each of the grid positions represents a connection zone. Each connection zone has a type associated with it, and whether a given pair of connection zones interact so as to provide a connection is determined by their types, e.g. as defined in a suitable data structure. In one embodiment, only those connection zones that interact with another connection zone within the model so as to form a connection are taken into account by the optimisation process when performing the occlusion testing. In addition to having a type, a connection zone also has an occlusion zone associated with it. By comparing the occlusion zones on both sides of a connection the process determines how a part of the component can be removed or replaced by an optional part on both sides of the connection. The optional part may have a level of detail lower than the level of detail of the part that is replaced by the optional part.

Whenever a component within a model is optimized for the purpose of rendering, the process may iterate through all parts of each component and examine the connection zones that each part is dependent on and that form a connection with another connection zone. The result determines whether the part may be removed, replaced by an optional part, or shown in full quality, depending on the respective types of the occlusion zones associated with the connection zones forming a respective connection.

For example, in a digital representation of the model, each part of the component that may potentially be removed during optimisation may be linked to a connection zone, e.g. by associating one or more suitable attributes to the part, such as an attribute identifying the regular grid and the position of the connection zone within said grid. In one embodiment, if a part does not depend on any connection zone then that part is always shown.

In one embodiment, whenever a part of the component is dependent on more than one connection zone, the optimization process determines the occlusion properties for each connection zone based on the connection properties of the connection zone and on the corresponding occlusion zones of the connected connection zones. For example, the result for each connection zone may be one of "hide", "optional", and "show". The overall result for a part dependent on more than one connection zone may then be determined as the result of the connection zone resulting in the least optimisation: e.g. for a part dependent on 8 connection zones, 7 "hide" and 1 "optional" results yield "optional"; similarly, 1 "hide" 6 "optional" and 1 "show" yields "show". If the result is "optional" and an optional part is not available for the current part, the result is converted into "show". If any single connection zone results in "show," no more connection zones need to be tested in respect of the current part. As long as no connection zone results in "show", the process keeps testing the remaining connection zones in order to determine a "hide"/"optional" result.

Figure 22:
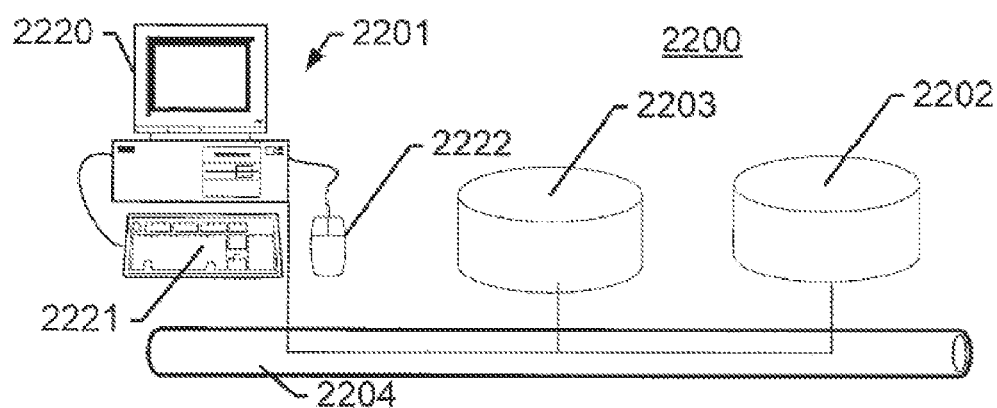
FIG. 22 shows a schematic view of an example of a computer system

FIG. 22 shows a schematic view of an example of a computer system. The computer system, generally designated 2200, comprises a suitably programmed computer 2201, e.g. a personal computer, a workstation, etc., comprising a display 2220, a keyboard 2221 and a computer mouse 2222 and/or another pointing device, such as a touch pad, a track ball, a light pen, a touch screen, or the like. The computer system further comprises a database 2202 for storing information about all accessible computer models, components and parts. The database 2203 may be any suitable database system, e.g. a relational database such as an Oracle or MySQL databases, or the like. The computer system further comprises a file storage device 2203. The file storage device may be any suitable type of remotely accessible storage like SMB or NFS-shares, etc., and the geometry definitions may be stored in any suitable directory structure.

The database 2202 and the file storage 2203 are accessible to the computer 2201 via a suitable computer network 2204, e.g. a local area network, a wide area network, an internet, or the like. It will be appreciated that the database 2202 and/or the file storage 2203 may be accessible to the computer 2201 directly or via another computer such as a file server, a database server, and/or the like. It will further be appreciated that the database 2202 and/or the file storage 2203 may be integrated into the computer 2201. It will further be appreciated that the information about computer models, components and parts may be stored in a different manner.

The computer system 2200 is adapted to facilitate visualising/rendering of computer models The computer system can be used as a stand-alone system or in connection with other computers. Accordingly, in some embodiments, the computer system 2200 further comprises one or more interfaces for connecting the computer with other computers via a computer network, e.g. the Internet.

Figure 24:
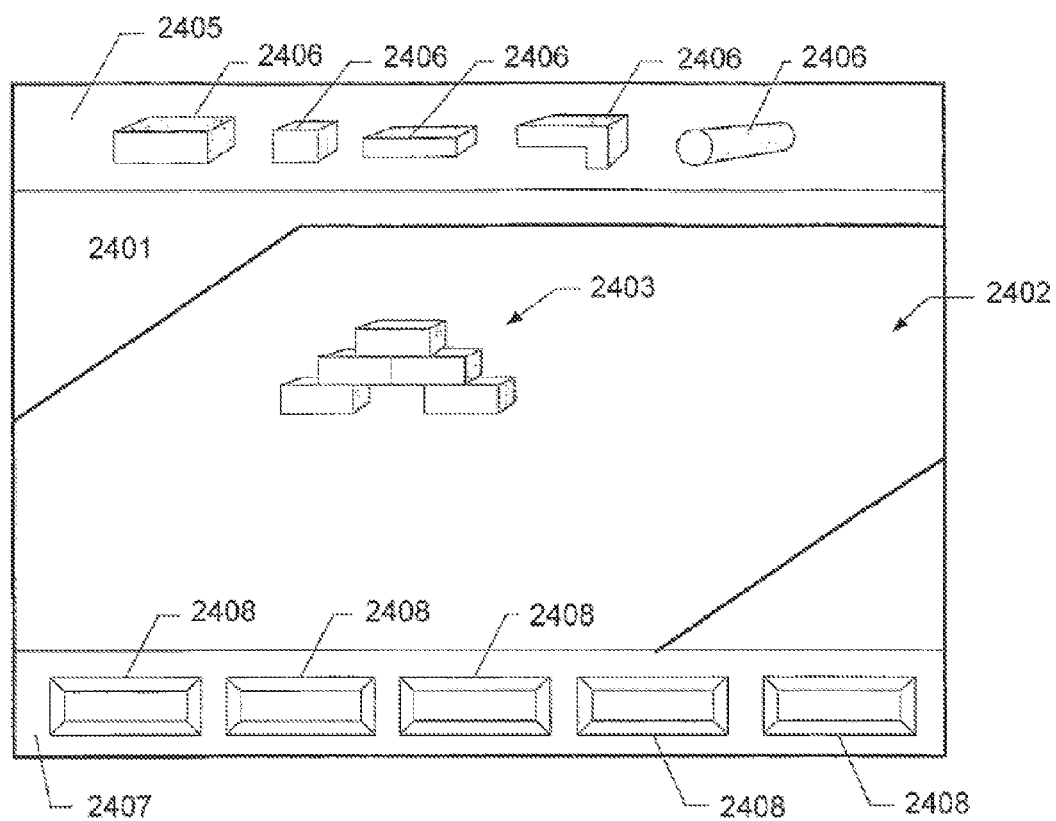
FIG. 24 shows a graphical user interface of a computer-implemented construction tool according to an embodiment of the invention.

FIG. 24 shows a graphical user interface of a computer-implemented construction tool. The user-interface comprises a display area 2401 showing a view of a 3D scene with a base plate 2402 and a computer model 2403 comprising a number of interconnected components 2404. The scene is shown from a predetermined viewpoint. In the following, this viewpoint will also be referred to as the (virtual) camera position, as it correspond to a position from which a camera would record a picture of a real structure corresponding to the graphical picture shown in the display area.

Each of the components corresponds to an active element of the graphical user-interface that may be activated, e.g. by clicking on it with a computer mouse, to select that component. In one embodiment, a selected component changes appearance. For example, the selected component may change colour, texture, etc.; it may be highlighted by showing a bounding box around the selected building block, or the like. A user may manipulate a selected component, e.g. changing its properties, e.g. its colour, deleting it, performing a copy and paste operation, dragging it to a different position, rotating it, or the like.

The user-interface further comprises a palette panel 2405 comprising a number of different components 2406 that may be selected by the user. For example, a user may click on one of the components 2406 with the mouse, thereby selecting that component, and drag the selected component into the display area 2401 to connect it to the structure 2403 or to the base plate 2402. The user-interface further comprises a menu bar 2407 comprising a number of menu buttons 2408 for activating various functions or tools. For example, the tool bar may comprise a rotation tool for changing the virtual camera position, thereby allowing the user to view the building area from different directions. The menu bar may further comprise a zoom tool for zooming in and out to/from the 3D scene. Other examples of tools include a palette tool for selecting different palettes 2405 each comprising a different set of components, a colouring tool for colouring parts of the structure, an eraser tool for erasing building blocks, etc.

The menu bar 2407 may further provide standard functions, such as functions for saving a model, opening a previously saved model, printing an image of a model, a help function, etc.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

What is claimed is:

1. A computer-implemented method for visualising/rendering a computer model, the computer model comprising a plurality of components wherein the method comprises:
   storing, in a database of a computer system, digital representations of a plurality of parts of at least one of the plurality of components, each part including geometry information for visualising/rendering the part,
   storing, in the database of the computer system, information indicative of the position and orientation of a plurality of components in a coordinate system,
   determining, by a processor of a programmable computer of the computer system, a spatial relationship between individual ones of the components based on the stored information indicative of the position and orientation of the plurality of components,
   determining, by the processor, for the at least one component, and based on the determined spatial relationship between the individual components, one or more hidden parts that can be removed without having visual impact on the computer model, and
   displaying, by a display of the computer system, graphics of visualizing/rendering of the computer model using a subset of said plurality of stored parts that have not been determined to be hidden parts;
   wherein the step of determining for the at least one component a number of parts to use for visualising/rendering said component further comprises the step of determining material properties of a component, and based on both the determined spatial relationship and the determined material properties, determining a number of parts to use for visualising/rendering said component.

2. A computer-implemented method for visualizing/rendering a computer model according to claim 1, wherein at least one predetermined connection zone is defined in relation to at least one component, wherein said connection zone is indicative of a portion of the component that can be connected to one or more connection zones of another component.

3. A computer-implemented method for visualising/rendering a computer model according to claim 2, wherein the step of determining a spatial relationship between individual components comprises the step of determining the spatial relationship of connection zones of the individual components.

4. A computer-implemented method for visualising/rendering a computer model according to claim 3, wherein the step of determining the spatial relationship between individual connection zones comprises the step of determining a distance between two connection zones, and where said connection zones are connected when a distance is within a predetermined interval.

5. A computer-implemented method for visualising/rendering a computer model according to claim 3, wherein the step of determining the spatial relationship between individual connection zones comprises the step of determining the orientation of one connection zone relative to another.

6. A computer-implemented method for visualising/rendering a computer model according to claim 1, wherein a first component comprises a first occlusion zone of a predetermined type and a second component comprise a second occlusion zone of a predetermined type wherein the spatial relationship between the first and second occlusion zone is used to determine a portion of the first component occluded by the second component.

7. A computer-implemented method for visualising/rendering a computer model according to claim 1, wherein the method comprises determining a part as not used for visualising rendering a component when at least a predetermined portion of the surface area of the part is covered by one or more other parts when viewed from any direction outside of the bounding box of said computer model.

8. A computer-implemented method for visualising/rendering a computer model according to claim 1, wherein the step of determining material properties comprises the step of determining the transparency settings for a component.

9. A computer-implemented method for visualising/rendering a computer model according to claim 1, wherein the computer model represents a composite product.

10. A computer-implemented method for visualising/rendering a computer model according to claim 1, comprising at least a design step comprising
providing a computer-implemented construction tool for allowing a user to select a respective digital representation of a plurality of components from a repository of components, where each component is comprised of a plurality of parts, and to arrange the selected-components in a spatial relationship to each other so as to generate a digital representation of a composite product.

11. A computer-implemented method for visualising/rendering a computer model according to claim 10, comprising a toy computer program for children.

12. A computer-implemented method for visualising/rendering a computer model according to claim 1, further comprising a non-transitory computer-readable medium having a computer program recorded thereon for a data structure for use with a computer-implemented method, wherein the data structure comprises a data structure for the computer model comprising:
model parameters; and
a number of components;
wherein each component comprises a data structure comprising:
component parameters, the component parameters comprising stored information related to the position and orientation of the number of components,
a number of connection zones, comprising a data structure comprising connection zone parameters, the connection zones configured to provide spatial relationship between individual ones of the components based on the stored information indicative of the position and orientation of the number of components for determining one or more hidden parts that can be removed without having visual impact on the computer model;
a number of occlusion zones, comprising a data structure comprising occlusion zone parameters; and
a number of parts, comprising a data structure comprising part parameters.

13. A system having stored and executable thereon program code means adapted to cause the system to perform the steps of the method of claim 1.

14. A computer program product comprising a non-transitory computer-readable medium having stored thereon the program code means adapted to cause a data processing system to perform the method of claim 1.

15. A computer-implemented method for visualising/rendering a computer model, the computer model comprising a plurality of components wherein the method comprises:
storing, in a database of a computer system, digital representations of a plurality of parts of at least one of the plurality of components, each part including geometry information for visualising/rendering the part, wherein the at least one of the plurality of components has associated with it at least one predetermined connection zone indicative of a portion of the component that can be connected to connection zones of other components,
storing, in the database of the computer system, information indicative of the position and orientation of a plurality of components in a coordinate system,
determining, by a processor of a programmable computer of the computer system, a spatial relationship between individual ones of the components based on the stored information indicative of the position and orientation of the plurality of components, the spatial relationship being indicative of whether said predetermined connection zone is connected to a connection zone of another component,
determining, by the processor, for the at least one component, and based on the determined spatial relationship between the individual components, one or more hidden parts that can be removed without having visual impact on the computer model, wherein a part is determined as hidden if the component has a connection zone associated with said hidden part, the connection zone being connected to another connection zone of another component, and
displaying, by a display of the computer system, graphics of visualizing/rendering of the computer model using a subset of said plurality of stored parts that have not been determined to be hidden parts.

16. A computer-implemented method for visualising/rendering a computer model, the computer model comprising a plurality of components wherein the method comprises:
storing, in a database of a computer system, digital representations of a plurality of parts of at least one of the plurality of components, each part including geometry information for visualising/rendering the part,
storing, in the database of the computer system, information indicative of the position and orientation of a plurality of components in a coordinate system,
determining, by a processor of a programmable computer of the computer system, a spatial relationship between individual ones of the components based on the stored information indicative of the position and orientation of the plurality of components,
determining, by the processor, for the at least one component, and based on the determined spatial relationship between the individual components, one or more hidden parts that can be removed without having visual impact on the computer model, and
displaying, by a display of the computer system, graphics of visualizing/rendering of the computer model using a subset of said plurality of stored parts that have not been determined to be hidden parts;
wherein a first part and a second part represent a common section of a component, wherein the first part has a higher level of detail than the second part and wherein the step of determining a number of stored parts to use for visualising/rendering said component further comprises selecting at most one of the first and second part to use for visualising/rendering said component.

* * * * *